(12) United States Patent
Gomez Gutierrez et al.

(10) Patent No.: US 10,332,394 B2
(45) Date of Patent: Jun. 25, 2019

(54) UNMANNED AERIAL VEHICLES AND RELATED METHODS AND SYSTEMS

(71) Applicant: Intel Corporation, Santa Clara, CA (US)

(72) Inventors: David Gomez Gutierrez, Zapopan (MX); Leobardo Emmanuel Campos Macias, Guadalajara (MX); Jose Ignacio Parra Vilchis, Guadalajara (MX); Rafael De La Guardia Gonzalez, Teuchitlan (MX); Rodrigo Aldana Lopez, Zapopan (MX)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/806,134

(22) Filed: Nov. 7, 2017

(65) Prior Publication Data
US 2019/0051169 A1 Feb. 14, 2019

(51) Int. Cl.
*B64C 39/02* (2006.01)
*G08G 1/0955* (2006.01)

(52) U.S. Cl.
CPC ......... *G08G 1/0955* (2013.01); *B64C 39/024* (2013.01); *B64C 2201/024* (2013.01); *B64C 2201/108* (2013.01); *B64C 2201/12* (2013.01)

(58) Field of Classification Search
CPC .................................................... G08G 1/0955
USPC ........................................................ 340/908
See application file for complete search history.

(56) References Cited

U.S. PATENT DOCUMENTS

| | | | |
|---|---|---|---|
| 9,170,117 B1* | 10/2015 | Abuelsaad | G01C 21/34 |
| 2017/0137125 A1* | 5/2017 | Kales | B64C 39/024 |
| 2017/0139409 A1* | 5/2017 | Clarke | G05D 1/0011 |
| 2017/0162059 A1* | 6/2017 | Jarrell | G08G 5/0013 |
| 2017/0178222 A1* | 6/2017 | High | G06Q 30/0631 |
| 2017/0240279 A1* | 8/2017 | Molnar | B05B 17/08 |
| 2017/0285649 A1* | 10/2017 | Debreczeni | G05D 1/0246 |
| 2017/0358222 A1* | 12/2017 | Schubert | G08G 5/0069 |
| 2018/0033320 A1* | 2/2018 | Castelli | G08G 5/065 |
| 2018/0045522 A1* | 2/2018 | Aziz | G01C 21/3407 |
| 2018/0047319 A1* | 2/2018 | Barba | G09F 21/06 |
| 2018/0075759 A1* | 3/2018 | Kim | G08G 5/0069 |
| 2018/0090040 A1* | 3/2018 | Randall | G09F 21/08 |

(Continued)

FOREIGN PATENT DOCUMENTS

WO 2014080388 5/2014

OTHER PUBLICATIONS

Sen et al., "Controlled Optimization of Phases at an Intersection," Transportation Science, vol. 31, No. 1, Feb. 1997, 14 pages.

(Continued)

*Primary Examiner* — Santiago Garcia
(74) *Attorney, Agent, or Firm* — Hanley, Flight & Zimmerman, LLC

(57) ABSTRACT

Unmanned aerial vehicles and related methods and systems are disclosed. An example unmanned aerial vehicle, comprising: a body and a propulsion source to propel the unmanned aerial vehicle during flight; and a display carried by the unmanned aerial vehicle to display a message to coordinate traffic, the display actuatable between a deployed position to enable the message to be conveyed and a stowed position in which aerodynamics of the unmanned aerial vehicle are enhanced.

22 Claims, 21 Drawing Sheets

(56) References Cited

U.S. PATENT DOCUMENTS

2018/0111683 A1* 4/2018 Di Benedetto ....... B64C 39/024
2018/0120829 A1* 5/2018 Price ................... G05D 1/0016

OTHER PUBLICATIONS

Unpublished U.S. Appl. No. 15/387,239, filed Dec. 21, 2016, 108 pages.

* cited by examiner

UNMANNED AERIAL VEHICLES AND RELATED METHODS AND SYSTEMS

FIELD OF THE DISCLOSURE

This disclosure relates generally to unmanned aerial vehicles, and, more particularly, to unmanned aerial vehicles and related methods and systems.

BACKGROUND

When responding to an emergency, emergency response vehicles sometimes encounter traffic. Depending on the amount of traffic, the rate of travel of the emergency vehicle may be affected.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
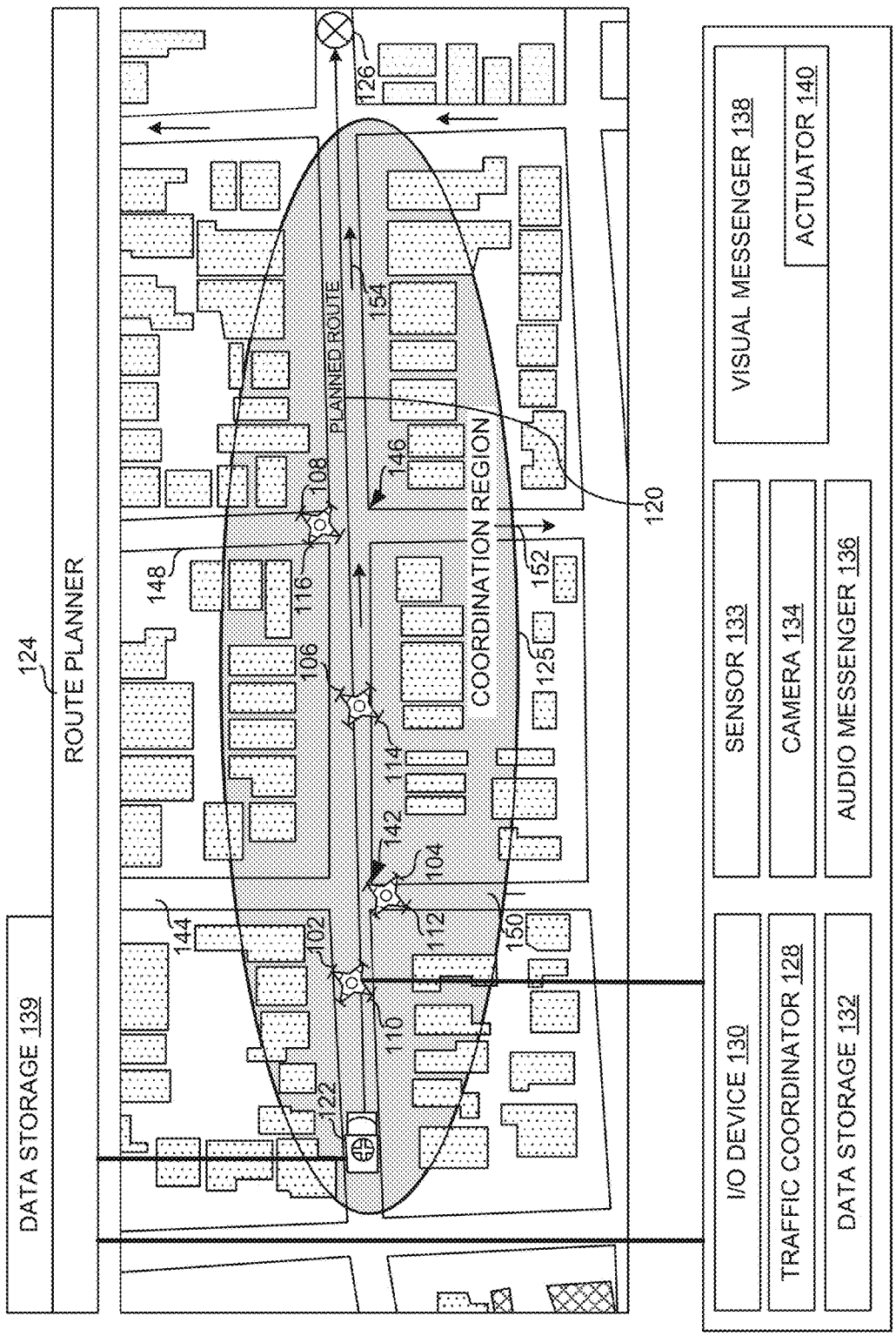
FIG. 1 is a schematic illustration of an example environment of use in which example unmanned aerial vehicles can be operated in accordance with the teachings of this disclosure.

The examples disclosed herein relate to aerial vehicles (e.g., unmanned aerial vehicles, drones, semi-autonomous drones, autonomous drones) that dynamically alert motorists of the presence of an emergency vehicle. The alerts may be in the form of visual messages and/or audio messages. In other words, the examples disclosed herein coordinate traffic flow to enable emergency vehicles to more efficiently reach their destination. The example UAVs may be autonomously piloted and/or remotely piloted.

To enable alerts and/or messages to be conveyed, in some examples, the UAVs are implemented with one or more lights, one or more sirens, one or more displays, one or more cameras and/or one or more radios. In some examples, the lights include emergency vehicle lights (e.g., a police light, an ambulance light, a firetruck light) and the sirens include emergency vehicle sirens (e.g., a police siren, an ambulance siren, a firetruck siren). In some examples, the displays are implemented by light-emitting diode (LED) displays that are structured to display messages to motorists and/or vehicles along and/or adjacent the emergency vehicle route.

The displays may be structured to be moved between a stowed position and a deployed position. In some examples, the displays are rotatable between the stowed position and the deployed position. In some examples, the displays are foldable between the deployed position and the stowed position.

In some examples, the cameras are gimballed cameras carried by the UAVs to capture data (e.g., image data and/or video data) associated with vehicles or other bodies (e.g., pedestrians, bicyclists, etc.). For example, the cameras may capture data including data associated with vehicles traveling toward the emergency vehicle, vehicles traveling away from the emergency vehicle, vehicles traveling toward the emergency vehicle route and/or vehicles traveling away from the emergency vehicle route. The cameras may be positioned and/or structured to capture the image and/or video data in one or more directions.

In some examples, the radios carried by the UAVs include vehicle-to-everything (V2X) radios that communicate with autonomous and/or connected vehicles and/or infrastructure (e.g., traffic lights). For example, the radios may manage traffic signals by commanding the change of traffic signals so that the emergency vehicle receives a green signal and/or the right of way to travel through the intersection and by commanding the change of traffic signals so that traffic traveling toward the emergency vehicle and/or toward the emergency vehicle route receives a red or another signal that alerts the vehicles of the approaching emergency vehicle and/or prevents the vehicles from entering and/or traversing the emergency vehicle route. Thus, the disclosed examples reduce traffic on the emergency vehicle route and/or prevent traffic from entering the emergency vehicle route to provide a right of way for emergency vehicles to traverse.

In some examples, one or more of the traffic signals are carried by other UAVs and are responsive to commands provided by the UAVs associated with the emergency vehicle and/or commands provided by the emergency vehicle itself. In some examples, one or more of the traffic signals are standard traffic signals that are responsive to commands provided by the UAVs associated with the emergency vehicle and/or commands provided by the emergency vehicle itself. The standard traffic signals may be a traffic signal coupled to a pole that extends into the ground, a traffic light that is not carried by a UAV, etc. Additionally or alternatively, the radios may communicate with vehicles on or adjacent the route (e.g., in addition to communicating with the emergency vehicle) to provide messages displayable within the vehicle. Alternatively, the messages provided to and received within the vehicles may be audio messages.

In some examples, the one or more UAVs travel on and/or adjacent an emergency vehicle route and identify and provide notice to vehicles, motorists and/or pedestrians of the presence of the emergency vehicle. The message may notify vehicles to provide a lane for the emergency vehicle to reach its destination in less time and/or in a safer manner.

To enable traffic to efficiently move out of the way to provide a lane for the emergency vehicle in multi-lane traffic (e.g., urban settings, highways), in some examples, the UAVs work together, communicate and/or provide a traffic solution that moves multiple lanes of traffic out of the way to provide a free lane for the UAV to traverse. For example, some of the UAVs may alert vehicles traveling on the emergency vehicle route of the approaching emergency vehicle and others of the UAVs may alert vehicles traveling toward the emergency vehicle route to avoid the emergency vehicle route all together (e.g., detour their current route based on the emergency vehicle route). Thus, the coordinated messages provided by the UAVs reduce traffic saturation on the emergency vehicle route to enable the emergency vehicle to reach its destination in a more efficient manner.

Depending on the direction that the vehicles are traveling, the vehicles may receive different messages. For example, a vehicle identified as proceeding toward an intersection with the emergency vehicle route may receive a message to stop and/or to not proceed through the intersection and a vehicle identified as proceeding in the same direction as the emergency vehicle may receive a message to move toward the side of the road and/or to exit (e.g., turn off) the emergency vehicle route.

To enable the messages to be provided to vehicles and/or motorists at an intersection, in some examples, the UAVs hover at the intersection and display a first signal (e.g., one or more red signals) to traffic approaching the intersection to stop and display a second signal (e.g., a green signal) to the oncoming emergency vehicle to enable the emergency vehicle to pass through the intersection without stopping. In some examples, the UAVs couple to an existing structure (e.g., a light pole) and/or the emergency vehicle to conserve power and/to coordinate traffic. In some such examples, the UAVs communicate with and/or override the traffic signals provided by existing traffic lights to deter mixed signals from being conveyed to vehicles and/or motorists.

When a UAV identifies a vehicle on and/or adjacent the emergency vehicle route, in some examples, a message is provided to the identified vehicle of the presence of the emergency vehicle and the UAV providing the message subsequently determines if the identified vehicle is responsive to the message. If the identified vehicle is responsive to the message, the UAVs may move further along the emergency vehicle route to identify and/or notify other vehicles of the presence of the emergency vehicle. The identified vehicle may be considered responsive if the identified vehicle moves to the side of the rode, the identified vehicle initiates a turn signal, etc. If the identified vehicle is determined not to be responsive to the message, the UAV may continue to provide messages to the identified vehicle and/or may heighten the messages provided to the identified vehicle until the vehicle is identified as being responsive to the message. The identified vehicle may be considered not responsive if the identified vehicle stays its previous course, does not slow down, does not attempt to pull to the side of the road, etc.

If the identified vehicle is determined not to be responsive to the message, in some examples, the UAV may generate an alert accessible by the emergency vehicle regarding the non-responsiveness of the vehicle. Thus, if the non-responsive vehicle is approaching an intersection with the emergency vehicle route, in some examples, the emergency vehicle is alerted of the non-responsive vehicle to provide notice to the driver of the emergency vehicle to traverse the intersection safely. Additionally or alternatively, if a responsive vehicle is approaching the intersection with the emergency vehicle route, in some examples, the emergency vehicle is alerted of the responsiveness of the vehicle.

The UAVs implemented with the teachings of this disclosure may provide any type of message or messages to alert vehicles, motorists, pedestrians, etc. of the emergency vehicle. For example, the messages may include visual messages displayed by the UAVs, visual messages projected by the UAVs (e.g., projected onto the road, projected onto a building adjacent the rode, etc.) and/or audio messages emitted by the UAVs.

In some examples, the UAVs travel at a first rate when no vehicles are identified on and/or adjacent the emergency vehicle route and travel at a second rate when vehicles are identified on and/or adjacent the emergency vehicle route. When the UAVs are implemented with displays to provide messages to motorists, etc., in some examples, the displays of the UAVs are retractable and/or rotatable to deter the displays from affecting the aerodynamics of the UAVs when the UAVs are traveling at the second rate or otherwise.

To enable the displays to be movable and/or carried by the UAVs, in some examples, the UAVs include an example support base including example support arms from which the displays are hung and/or suspended. When the UAVs are directing traffic on a one-way street, the UAVs may be implemented with one or more displays facing the same direction. When the UAVs are directing traffic on a two-way street, the UAVs may be implemented with two or more displays facing in different directions (e.g., opposite directions). When the UAVs are directing traffic at a four-way intersection, the UAVs may be implemented with four or more displays facing in different directions. Regardless of the number of displays included, in some examples, the UAVs displays are positioned to deter the support base and its displays from affecting a center of mass of the UAVs.

In some examples, the displays are coupled (e.g., rotatably coupled) to the support arms and actuatable between a raised position and a lowered position. To actuate the displays, in some examples, a first motor drives a first gear that interfaces with a second gear of the respective displays.

In some such examples, rotation of the first gear rotates the second gear and, in turn, the display between the deployed position and the stowed position. To enable the first motor to be smaller, in some examples, the gears are sized to increase the resultant torque generated by the first motor. To enable the positions of the displays to change relative to a base of the UAV, in some examples, the support base includes a second motor that drives a crank and/or otherwise rotates the support arms. In some examples, the support arms are rotated together. In other examples, the support arms are rotated independently.

In other examples, the displays include example pleated and/or segmented displays that are foldable upon themselves when being drawn to the retracted and/or stowed position (e.g., similar to pleated blinds). In some examples, the displays include fabric or another foldable material that carry LEDs to enable the display to emit messages.

To enable the displays to be actuated between a stowed position and a deployed position, an example display assembly carried by the UAV includes support arms having pulleys that receive one or more cables. In some examples, the cables extend through apertures defined on sides of the respective display segments or the fabric of the displays. Some of the pulleys may direct the one or more cables to be received by the apertures of the display segments or the fabric of the displays and other of the pulleys may be implemented as spindles that are driven by motors that draw in or let out the cable to stow or deploy the displays. To move the display from the raised position to the lowered position, in some examples, a motor rotates the pulley/spindle to let out the cable and enable the display to lower. To move the display from the lowered position to the raised position, in some examples, the motor rotates the pulley/spindle to draw in the cable and cause the display to raise.

FIG. 1 illustrates first, second, third and fourth unmanned aerial vehicles (UAV) 102, 104, 106, 108 having respective propulsion sources, engines and/or propellers 110, 112, 114, 116. In this example, the first, second, third and fourth UAVs 102, 104, 106, 108 are coordinating traffic flow along an example emergency vehicle route 120 being traversed by an example emergency vehicle 122.

In the illustrated example, the UAVs 102, 104, 106, 108 receive commands (e.g., flight commands, messaging commands) from and provide feedback to an example route planner 124 of the emergency vehicle 122. In some examples, the commands include details of the emergency vehicle route 120 determined by the route planner 124, the roles that the respective UAVs 102, 104, 106, 108 are to take in coordinating traffic, details of an example coordination region 125 and/or goals of a mission (e.g., an estimated time of arrival, a rate of travel of the emergency vehicle 122, etc.). The coordination region 125 may be defined as the area that the UAVs 102, 104, 106, 108 are tasked with coordinating traffic between the emergency vehicle 122 and a destination 126 of the emergency vehicle 122.

In some examples, the route planner 124 processes the data accessed from the UAVs 102, 104, 106 and/or 108 and/or other available data and generates and/or updates the emergency vehicle route 120. For example, in response to the feedback received and/or other available data, in some examples, the route planner 124 determines the emergency vehicle route 120 for the emergency vehicle 122 to reach the destination 126 at an earlier time and/or to enable the emergency vehicle 122 to reach the destination 126 in a safer manner (e.g., traveling along a route with less vehicle saturation). Additionally or alternatively, in some examples, the route planner 124 processes data accessed from the UAVs 102, 104, 106, 108 and/or other available data and defines and/or updates the coordination region 125 to enable the emergency vehicle route 122 to satisfy the goals of the mission.

In some examples, the route planner 124 assigns tasks to the UAVs 102, 104, 106, 108 to coordinate traffic at a first distance from the emergency vehicle 122 and in other examples the route planner 124 assigns tasks to the UAVs 102, 104, 106, 108 to coordinate traffic a second distance from the emergency vehicle 122. For example, if it is estimated that the emergency vehicle 122 will not reach the destination 126 at a particular time and the route planner 124 determines that notifying vehicles further ahead on the emergency vehicle route 120 will increase the pace at which the emergency vehicle 122 can travel, one or more of the UAVs 102, 104, 106, 108 may be assigned to notify vehicles further ahead on the emergency vehicle route 120. Thus, in this example, by reassigning and/or updating the tasks of the UAVs 102, 104, 106, 108, traffic on the emergency vehicle route 120 is reduced and the likelihood that the emergency vehicle 122 reaches the destination 126 within the particular time is increased. While the route planner 124 is discussed as being carried by the emergency vehicle 122, in other examples, the route planner 124 is implemented at another location such as, for example, a remote facility. Alternatively, while the route planner 124 is discussed as being carried by the emergency vehicle 122, in other examples, the route planner 124 is implemented by one or more of the UAVs 102, 104, 106 and/or 108. In other words, in some examples, one or more of the UAVs 102, 104, 106 and/or 108 determine the emergency vehicle route 120 based on information (e.g., dispatch information) received.

To enable data to be conveyed between the UAVs 102, 104, 106 and/or 108 and between the UAVs 102, 104, 106 and/or 108 and the route planner 124, the first UAV 102 includes an example traffic coordinator 128. In some examples, the traffic coordinator 128 accesses data, via an example input/output device 130, relating to a mission, the coordination region 125, the emergency vehicle route 120, the roles of the different UAVs 102, 104, 106, 108 during the mission and/or details relating to traffic on and/or adjacent the emergency vehicle route 120. In some examples, data relating to traffic along the emergency vehicle route 120 is accessed from an example data storage 132, one or more of the second, third and/or fourth UAVs 104, 106 and/or 108, the route planner 124, the emergency vehicle 122 and/or a third-party service.

To enable the position of the first UAV 102 to be determined, in this example, the first UAV 102 includes an example sensor 133 and an example camera 134. The sensor 133 may be implemented by a global positioning system (GPS) sensor, a radio detection ranging (RADAR) system, a light and ranging (LIDAR) system, an internal measurement unit (IMU) and/or one or more position sensors. Additionally or alternatively, the sensor 133 may be implemented by a vehicle-to-everything (V2X) radio that communicates via, for example, the I/O device 132 with autonomous and/or connected vehicles and/or infrastructure. For example, when the sensor 133 is implemented as a V2X radio, the sensor 133 is structured to manage traffic signals (e.g., changes the traffic signals to green to allow the emergency vehicle 122 to receive a green light) and/or communicates with the identified vehicles to enable the messages to be displayed or heard within vehicles on or adjacent the emergency vehicle route 120.

To enable data associated with the emergency vehicle 122 to be captured and/or to enable vehicles on and/or moving toward the emergency vehicle route 120 to be identified, the first UAV 102 includes the example camera 134. The camera 134 may be implemented by one or more gimballed cameras carried by the first UAV 102. In some examples, the camera 134 is implemented by a RealSense™ camera.

To enable messages to be conveyed from the first UAV 102 to alert others of the presence of the emergency vehicle 122, in the illustrated example, the first UAV 102 includes an example audio messenger 136 and an example visual messenger 138. In some examples, the audio messenger 136 includes a siren or other audio device to enable an audio message to be conveyed from the first UAV 102. In some examples, the visual messenger 138 includes a display (e.g., a LED display) that is movable between a stowed position and a deployed position via an example actuator 140.

To prevent the visual messenger 138 from negatively impacting the aerodynamics of the first UAV 102 when the visual messenger 138 is implemented by a display that hangs or is otherwise suspended from the first UAV 102, in some examples, the actuator 140 moves the visual messenger 138 between the deployed position and the stowed position. For example, when the speed of the first UAV 102 satisfies a first threshold, the actuator 140 may move the visual messenger 138 from the stowed position to the deployed position and, when the speed of the first UAV 102 satisfies a second threshold, the actuator 140 may move the visual messenger 138 from the deployed position to the stowed position.

In the stowed position, the aerodynamics of the first UAV 102 are enhanced and, thus, the first threshold may be a lesser speed than the second threshold. In other words, the visual messenger 138 may be deployed when the first UAV 102 travels at a slower speed and the visual messenger 138 may be stowed when the first UAV 102 travels at a faster speed. In other examples, the visual messenger 138 may be deployed regardless of the speed that the first UAV 102 is traveling to enable a message to be conveyed to, for example, a vehicle traveling on or adjacent the emergency vehicle route 120. In operation, the route planner 124 accesses data from an example data storage 139 and/or another source identifying the destination 126, the current and/or estimated traffic conditions to the destination 126 and/or the roads, intersections, etc., between the current location of the emergency vehicle 122 and the destination 126.

To generate the emergency vehicle route 120 and/or to define the coordination region 125, the route planner 124 processes the accessed data and generates the example emergency vehicle route 120 and/or defines the example coordination region 125. In some examples, the coordination region 125 is the area in which the first, second, third and fourth UAVs 102, 104, 106, 108 are to coordinate traffic during the mission of the emergency vehicle 122 reaching the destination 126.

In response to the route planner 124 generating the emergency vehicle route 120 and/or defining the coordination region 125, the route planner 124 assigns tasks to the different UAVs 102, 104, 106, 108 and the first, second, third and fourth UAVs 102, 104, 106 and 108 are deployed to different locations and/or zones on and/or adjacent the emergency vehicle route 120 and/or within the coordination region 125.

In the illustrated example, the first UAV 102 is assigned the task of patrolling a first distance from the emergency vehicle 122 to provide notice to vehicles, motorists, bicyclists, pedestrians, etc. of the presence of the emergency vehicle 122. In some examples, to provide early warning of the approaching emergency vehicle 120, the first UAV 102 maintains a threshold distance from the emergency vehicle 122 as the emergency vehicle 122 traverses the emergency vehicle route 120. When the first UAV 102 identifies a vehicle on or adjacent the emergency vehicle route 120, in some examples, the first UAV 102 provides a message to the identified vehicle via the audio messenger 136 and/or the visual messenger 138.

In some examples, as the first UAV 102 executes the tasks of the mission, the first UAV 102 generates feedback accessible by the emergency vehicle 122 and/or the route planner 124. In some examples, the feedback generated by the first UAV 102 includes data associated with vehicles identified along the emergency vehicle route 120, the direction of travel of the identified vehicles, the rate of travel of the identified vehicles and/or the vehicle saturation on and/or adjacent the emergency vehicle route 120. In some examples, the route planner 124 uses the feedback provided by one or more of the first, second, third and/or fourth UAVs 102, 104, 106 and/or 108 to update the emergency vehicle route 120 to enable the emergency vehicle 122 to reach the destination 126 within the shortest timeframe.

When a vehicle is identified on the emergency vehicle route 120 and a message is conveyed thereto, the example first UAV 102 monitors the responsiveness of the identified vehicle. Based on the monitoring, in some examples, the first UAV 102 generates feedback associated with the identified vehicle being responsive to the message conveyed by the first UAV 102 and/or feedback associated with the identified vehicle not being responsive to the message conveyed by the first UAV 102. In examples in which the identified vehicle is responsive to the message conveyed by the first UAV 102, the first UAV 102 may proceed along the emergency vehicle route 120 to notify subsequent vehicles of the approaching emergency vehicle 122. In examples in which the identified vehicle is not responsive to the message conveyed by the first UAV 102, the first UAV 102 may continue and/or escalate the messages conveyed to the identified vehicle in an attempt to cause the identified vehicle to make way for the approaching emergency vehicle 122.

As shown in the illustrated example, the second UAV 104 is deployed at a first intersection 142 of a first street 144 and the emergency vehicle route 120, the third UAV 106 is deployed a second distance from the emergency vehicle 122 and the fourth UAV 108 is deployed at a second intersection 146 of a second street 148 and the emergency vehicle route 120. In this example, the first street 144 is a one-way street in a direction generally indicated by arrow 150 and the second street 148 is a one-way street in a direction generally indicated by arrow 152. Thus, in this example, the second and fourth UAVs 104, 108 are shown positioned ahead of the respective intersections 142, 146 to provide notice to approaching vehicles before the vehicles enter the respective intersections 142, 146 and/or attempts to enter the emergency vehicle route 120 itself.

Because the emergency vehicle route 120 is illustrated as a one-way street in a direction generally indicated by arrow 154, in some examples, the first and third UAVs 102, 106 direct messages to vehicles on or adjacent the emergency vehicle route 120 in a direction generally opposite that of arrow 154. Because the first street 150 is a one-way street in the direction generally indicated by arrow 150, in some examples, the second UAV 104 directs messages to vehicles at the intersection 142 in a direction generally opposite that of the arrow 150. Because the second street 148 is illustrated as a one-way street in a direction generally indicated by arrow 152, in some examples, the fourth UAV 108 directs messages to vehicles at the intersection 146 in a direction generally opposite that of the arrow 152.

While the above examples mention the traffic coordinator 128 being implemented in the first UAV 102, the traffic coordinator 128 may additionally or alternatively be implemented by the route planner 124 and/or the emergency vehicle 122. Such an approach of implementing the traffic coordinator 128 and/or portions thereof in the route planner 124 and/or otherwise external to the first UAV 102 may enable the first UAV 102 to be smaller, lighter and/or cheaper to manufacture, etc. Additionally or alternatively, while the traffic coordinator 128, the I/O device 130, the data storage 132, the sensor 133, the camera 134, the audio messenger 136, the visual messenger 138 and the actuator 140 are described as being implemented in the first UAV 102, the second UAV 104, the third UAV 106 and/or the fourth UAV 108 may additionally or alternatively implement one or more of these elements.

Figure 2:
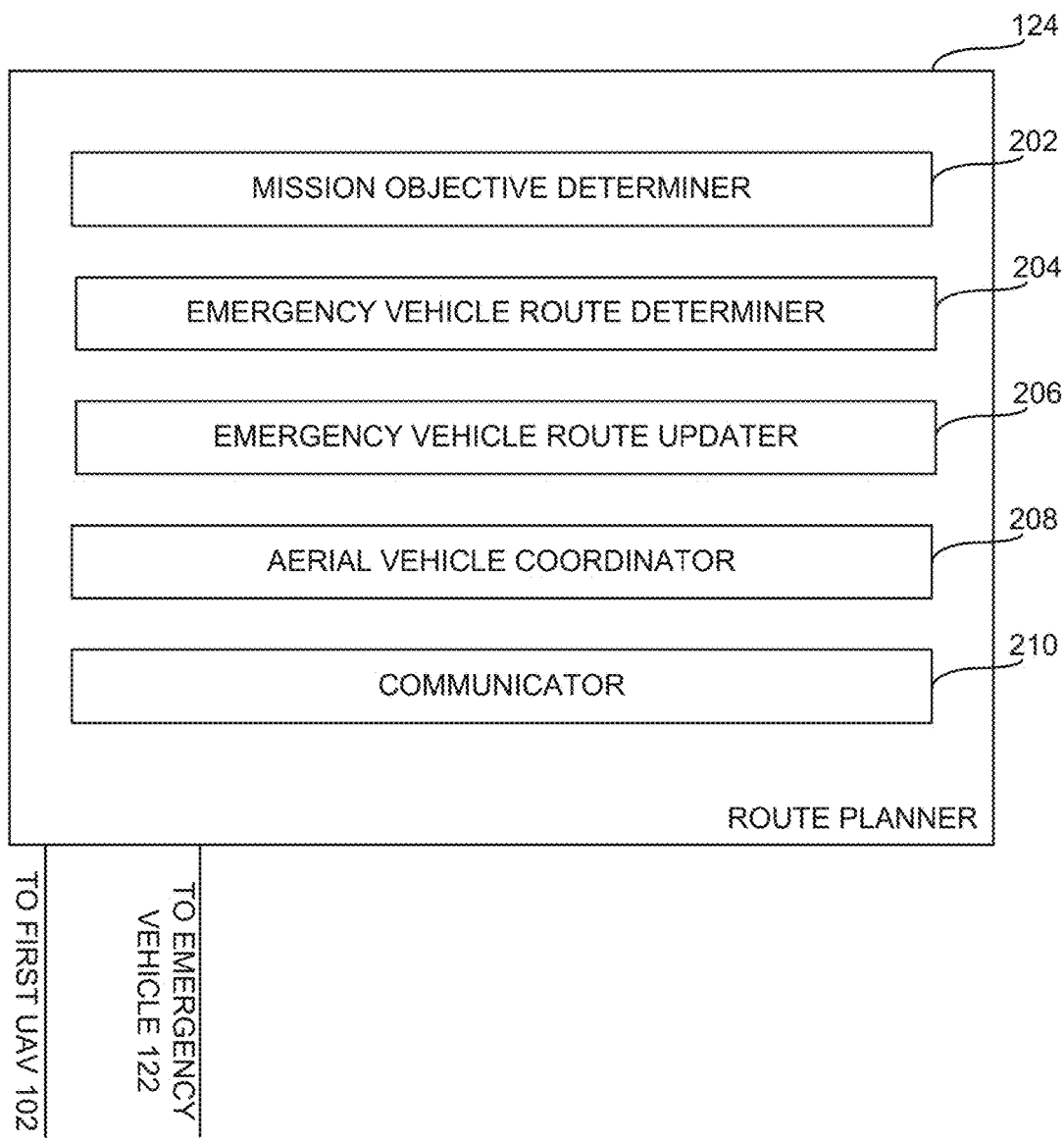
FIG. 2 is a block diagram of an example implementation of the example route planner of FIG. 1.

FIG. 2 illustrates an implementation of the example route planner 124 of FIG. 1. In the illustrated example, the route planner 124 includes an example mission objective determiner 202, an example vehicle route determiner 204, an example emergency route updater 206, an example aerial vehicle coordinator 208 and an example communicator 210.

In the illustrated example, to determine the mission objectives, the mission objective determiner 202 accesses data and/or other mission objective data from the database 139. In some examples, the mission objectives include arriving at the destination 126 within a threshold amount of time and/or arriving at the destination 126 at a particular time. Based on the mission objectives determined by the mission objective determiner 202, the emergency vehicle route 120 is determined and the coordination region 125 is defined by the emergency vehicle route determiner 204. In some examples, the emergency vehicle route 120 is the least-time route between the current location of the emergency vehicle 122 and the destination 126.

As the emergency vehicle 122 traverses the emergency vehicle route 120, in some examples, the emergency vehicle route updater 206 accesses data from the first, second, third and/or fourth UAVs 102, 104, 106, 108 and/or other data relating to the emergency vehicle route 120 to determine if the mission objectives will be achieved and/or if there is an alternative route other than the emergency vehicle route 120 that enables the emergency vehicle 122 to arrive at the destination 126 at an earlier time. In examples in which the emergency vehicle route updater 206 determines that the mission objectives are not achievable if the emergency vehicle 122 traverses the determined emergency vehicle route 120 and/or if the emergency vehicle route updater 206 identifies an alternative route that enables the emergency vehicle 122 to arrive at the destination 126 at an earlier time, the emergency vehicle route updater 206 updates the emergency vehicle route 120 to an updated emergency vehicle route.

As the emergency vehicle 122 traverses the emergency vehicle route 120 and/or the updated emergency vehicle route, the aerial vehicle coordinator 208 commands and/or communicates with the first, second, third and/or fourth UAVs 102, 104, 106, 108 to coordinate the traffic on and/or adjacent the emergency vehicle route 120 and/or within the coordination region 125. Based on the coordination region 125 defined and/or the emergency vehicle route 120 determined, in this example, the aerial vehicle coordinator 208 assigns the first UAV 102 the task of patrolling a first distance from the emergency vehicle 122, the second UAV 104 the task of patrolling the intersection 142, the third UAV 106 the task of patrolling a second distance from the emergency vehicle 122 and the fourth UAV 108 the task of patrolling the intersection 146.

In some examples, the aerial vehicle coordinator 206 commands the UAVs 102, 104, 106, 108 to convey messages to the identified vehicles to move to the side of the road and/or to stop to enable the emergency vehicle 122 to traverse the emergency vehicle route 120 unimpeded. Additionally or alternatively, in examples in which the emergency vehicle route updater 206 determines that the mission objectives are not achievable, in some examples, the aerial vehicle coordinator 208 updates the tasks assigned to the first, second, third and/or fourth UAVs 102, 104, 106, 108 to reduce traffic saturation and/or to increase a rate at which the emergency vehicle 120 can travel to reach the destination 126 by providing notice to vehicles further along the emergency vehicle route 120.

To enable others to be aware of the emergency vehicle 122 and/or the emergency vehicle route 120, in the illustrated example, the communicator 210 provides notice of the emergency vehicle 122, details on the mission of the emergency vehicle 122 and/or the emergency vehicle route 120 itself to other connected structures and/or third parties. In some examples, the communicator 210 communicates with another route planner such as, for example, Google Maps™ and/or Waze™ GPS-based geographical navigation application to enable routes of vehicles that would otherwise travel on and/or otherwise traverse the emergency vehicle route 120 to be updated.

While an example manner of implementing the route planner 124 of FIG. 1 is illustrated in FIG. 2, one or more of the elements, processes and/or devices illustrated in FIG. 2 may be combined, divided, re-arranged, omitted, eliminated and/or implemented in any other way. Further, the example mission objective determiner 202, the example emergency vehicle route determiner 204, the example emergency vehicle route updater 206, the example aerial vehicle coordinator 208, the communicator 210 and/or, more generally, the example route planner 124 of FIG. 2 may be implemented by hardware, software, firmware and/or any combination of hardware, software and/or firmware. Thus, for example, any of the example mission objective determiner 202, the example emergency vehicle route determiner 204, the example emergency vehicle route updater 206, the example aerial vehicle coordinator 208, the communicator 210 and/or, more generally, the example route planner 124 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example mission objective determiner 202, the example emergency vehicle route determiner 204, the example emergency vehicle route updater 206, the example aerial vehicle coordinator 208, the communicator 210 and/or, more generally, the example route planner 124 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example route planner 124 of FIG. 1 may include one or more elements, processes and/or devices in addition to, or instead of, those illustrated in FIG. 2, and/or may include more than one of any or all of the illustrated elements, processes and devices.

Figure 3:
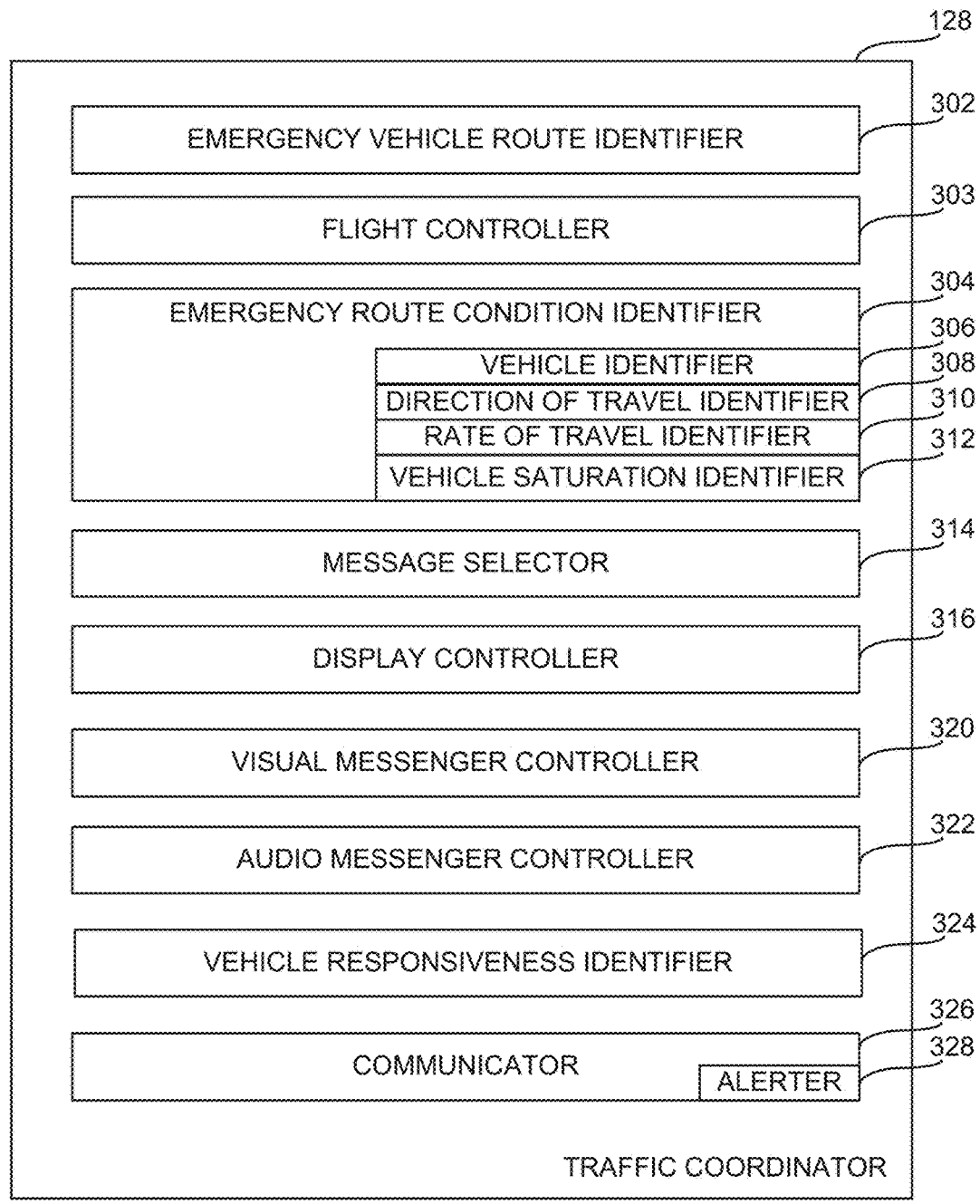
FIG. 3 is a block diagram of an example implementation of the example traffic coordinator of FIG. 1.

FIG. 3 illustrates an example implementation of the traffic coordinator 128 of FIG. 1. In the illustrated example, the traffic coordinator 128 includes an example emergency vehicle route identifier 302, an example flight controller 303 and an emergency route condition identifier 304 including an example vehicle identifier 306, an example direction of travel identifier 308, an example rate of travel identifier 310 and an example vehicle saturation identifier 312. Additionally, in the illustrated example, the traffic coordinator 128 includes an example message selector 314, an example display controller 316, an example visual messenger controller 320, an example audio messenger controller 322, an example vehicle responsiveness identifier 324 and an example communicator 326 including an example alerter 328.

In the illustrated example, the emergency vehicle route identifier 302 is structured to access the emergency vehicle route 120 and/or the coordination region 125 generated by the example emergency vehicle route determiner 204. In some examples, the emergency vehicle route 120 and/or the coordination region 125 is accessed from the data storage 132 and/or via the communicator 326. The emergency vehicle route 120 and/or the coordination region 125 may be accessed by the emergency vehicle route identifier 302 prior to the first UAV 102 coordinating traffic along the emergency vehicle route 120 and/or while the first UAV 102 is coordinating traffic along the emergency vehicle route 120.

Once accessed, in some examples, the emergency vehicle route identifier 302 identifies one or more tasks and/or assignments to be completed by the first UAV 102 during the mission. Additionally or alternatively, the emergency vehicle route identifier 302 identifies attributes of the emergency vehicle route 120, the coordination region 125 and/or streets intersecting and/or otherwise associated with the emergency vehicle route 120 and/or the coordination region 125. For example, the emergency vehicle route identifier 302 may determine if the one or more streets along the emergency vehicle route 120 are unidirectional or bidirectional. Additionally or alternatively, the emergency vehicle route identifier 302 may identify attributes of any location or region on and/or adjacent the emergency vehicle route 120 and/or the coordination region 125. In some examples, the emergency vehicle route identifier 302 accesses data associated with the emergency vehicle route 120 and/or the coordination region 125 from third parties (e.g., Waze™ GPS-based geographical navigation application, Google Maps™ mapping service) and/or the route planner 124.

In response to the emergency vehicle route identifier 302 identifying the emergency vehicle route 120 and/or a command accessed from the aerial vehicle coordinator 208 defining one or more tasks to be completed by the first UAV 102 during the mission, the flight controller 303 causes the first UAV 102 to fly to its commanded position and/or to perform one or more of the assigned tasks. In the example of FIG. 1, the flight controller 303 commands the first UAV 102 to fly to a location between the first intersection 142 and the emergency vehicle 122 and/or a threshold distance ahead of the emergency vehicle 122.

In some examples, during the mission of the emergency vehicle 122 arriving at the destination 126, the flight controller 303 commands the first UAV 102 to maintain the threshold distance between the first UAV 102 and the emergency vehicle 122. The threshold distance may be dynamically updated based on one or more parameters. The parameters may include, for example, saturation (e.g., vehicle saturation) on and/or adjacent the emergency vehicle route 120, responsiveness of vehicles to messages provided and/or an amount, proximity and/or location of roads that intersect the emergency vehicle route 120. Additionally, in some examples, the threshold distance and/or the one or more tasks to be completed by the first UAV 102 may be updated by the aerial vehicle coordinator 208. For example, to provide earlier notice of the approaching emergency vehicle 122, the flight coordinator 303 responding to updated commands from the aerial vehicle coordinator 208 of the route planner 124 may cause the first UAV 102 to change its flight pattern and/or the distance from the emergency vehicle 122.

As the flight controller 303 causes the first UAV 102 to hover on and/or adjacent the emergency vehicle route 120, the vehicle identifier 306 identifies vehicles. To identify the vehicles, in some examples, the vehicle identifier 306 accesses image and/or video data from the sensor 133, the camera 134 and/or other sources (e.g., connected structures, etc.) and processes the image and/or video data. The processing may include comparing the accessed data to reference data stored at, for example, the data storage 132.

In examples in which the image and/or video data is substantially similar to reference data associated with vehicles, bicyclists, pedestrians, etc., in some examples, the vehicle identifier 306 generates a notice associated with a body (e.g., a vehicle, a bicyclist, a pedestrian) being near the first UAV 102 and the communicator 326 communicates the notice to the route planner 124, another source and/or one or more of the second, third or fourth UAVs 104, 106, 108. In examples in which the image and/or video data is not substantially similar to reference data associated with a vehicle or another body, in some examples, the vehicle identifier 306 generates a notice associated with a vehicle not being near the first UAV 102 and the communicator 326 communicates the notice to the route planner 124 and/or one or more of the second, third or fourth UAVs 102, 104, 106. When the vehicle identifier 306 identifies a vehicle on or adjacent the emergency vehicle route 120, in this example, the direction of travel identifier 308 determines the direction that the vehicle is traveling and the rate of travel identifier 310 determines the speed that the identified vehicle is traveling.

In some examples, the direction of travel identifier 308 determines the direction of travel of the identified vehicle by accessing image and/or video data from the sensor 133, the camera 134 and/or other sources (e.g., connected structures, etc.) and processing the image and/or video data to identify a first distance between the identified vehicle and the first UAV 102 or a fixed structure at a first time and a second distance between the identified vehicle and the first UAV 102 or the fixed structure at a second time. In examples in which the second distance is greater than the first distance, the direction of travel identifier 308 determines that the identified vehicle is traveling away from the first UAV 102. In examples in which the first distance is greater than the second distance, the direction of travel identifier 308 determines that the identified vehicle is traveling toward the first UAV 102. To determine the rate of travel of the identified vehicle, in some examples, the rate of travel identifier 310 divides a first difference between the first and second distances and a second difference between the first and second times. However, the rate of travel identifier 310 may determine the rate of travel of the identified vehicles in many different ways.

To determine a saturation level on and/or adjacent the emergency vehicle route 120, in the illustrated example, the vehicle saturation identifier 312 determines a vehicle saturation value at the first intersection 142 based on one or more values. The values may include a number of vehicles proximate the first intersection 142, the direction of travel of the identified vehicles proximate the first intersection 142, the relative distances between the identified vehicles and/or the rate of travel of the identified vehicles proximate the first intersection 142. While the vehicle saturation identifier 312 may determine the vehicle saturation value in many different ways, in some examples, the vehicle saturation identifier 312 determines the vehicle saturation value using data accessed from one or more sources including the vehicle identifier 306, the direction of travel identifier 308 and/or the rate of travel identifier 310. Additionally or alternatively, in some examples, the vehicle saturation identifier 312 determines the vehicle saturation value using values and/or parameters accessed from one or more sources including the data storage 132, one or more of the second, third and/or fourth UAVs 104, 106, 108, the emergency vehicle 122 and/or third parties (e.g., Waze™ GPS-based geographical navigation application, Google Maps™ mapping service), etc.

In some examples in which the vehicle identifier 306 identifies a vehicle on and/or adjacent the emergency vehicle route 120, the message selector 314 selects a message to provide to the identified vehicle. In examples in which the first UAV 102 is providing messages and/or alerts to vehicles traveling in the same direction as the emergency vehicle 122, the message selector 314 may select a message that encourages the vehicle to move to the side of the emergency vehicle route 120, to provide a lane for the emergency vehicle 122 to traverse and/or to exit the emergency vehicle route 120. The message may include an arrow (e.g., a green arrow) or some other type of visual and/or audio notice announcing the presence of the emergency vehicle 122. The message may be provided by the audio messenger 136 and/or the visual messenger 138.

In examples in which the first UAV 102 is providing messages and/or alerts to vehicles traveling to enter or traverse the emergency vehicle route 120, the message selector 314 may select a message to convey that encourages the identified vehicle to take an alternative route that does not affect the emergency vehicle route 120, to not enter the emergency vehicle route 120 and/or to not travel through the first intersection 142 until after the emergency vehicle 122 has travelled past the first intersection 142. In any of these examples, the message selector 314 may select one or more messages based on the emergency vehicle route 120 being a unidirectional road or a bidirectional road and/or the first UAV 102 being stationed at an intersection such as, for example, the first intersection 142.

Depending on the one or more messages selected by the message selector 314, in this example, the visual controller 320 causes the actuator 140 to move the visual messenger 138 to the deployed position and/or causes the visual messenger 138 to display the selected messages (e.g., visual commands) toward the identified vehicles. In some examples, the visual controller 320 causes the actuator 140 to rotate the visual messenger 138 relative to a central axis of a body of the first UAV 102 to enable the visual messenger 138 to face the identified vehicle. Thus, the visual messenger 138 is moveable relative to the body of the first UAV 102. Additionally or alternatively, depending on the one or more messages selected by the message selector 314, in some examples, the audio controller 322 causes the audio messenger 136 to convey the selected messages (e.g., siren sounds; verbal commands) toward the identified vehicles. In some examples, the respective controllers 320, 322 cause the audio messenger 136 and/or the visual messenger 138 to convey messages throughout the mission to provide advance notice of the emergency vehicle 122.

In some examples, when the visual message controller 320 and/or the audio messenger controller 322 cause the audio and/or the visual messenger 136, 138 to provide a message to the identified vehicle, the vehicle responsiveness identifier 324 identifies if the identified vehicle is responsive to the message. To determine the responsiveness of the identified vehicle, in some examples, the vehicle responsiveness identifier 324 accesses image and/or video data from the sensor 133, the camera 134 and/or other sources (e.g., connected structures, etc.) and processes the image and/or video data to determine a change in the direction of travel of the identified vehicle, a change in a lane of travel of the identified vehicle and/or an advancement on and/or toward the emergency vehicle route 120. For example, the vehicle responsiveness identifier 324 may determine that the identified vehicle is responsive to the message provided if the identified vehicle moves to the side of the emergency vehicle route 120 and/or stops.

In examples in which the vehicle responsiveness identifier 324 determines that the identified vehicle is not responsive to the message provided, the vehicle responsive identifier 324 and/or the alerter 328 may generate a notice associated with the nonresponsiveness of the identified vehicle. The vehicle responsiveness identifier 324 may determine that the identified vehicle is not responsive to the message provided if the vehicle continues on its previous route without an indication of receiving the message.

The notice may be stored in the data storage 132 and/or may be accessible by the message selector 314, the route planner 124 and/or the emergency vehicle 122. In some examples, when the identified vehicle is determined not to be responsive to the provided message, the message selector 314 may select a different message (e.g., a heightened message) and/or continue to provide notice to the identified vehicle until the vehicle responsiveness identifier 324 determines that the identified vehicle is responsive to the message.

If vehicle responsiveness identifier 324 determines that the identified vehicle is responsive to the message (e.g., the vehicle moves to the side of the rode), in some examples, the first UAV 102 moves further along the emergency vehicle route 120 to identify and/or notify other vehicles of the presence of the emergency vehicle 122. However, in examples in which the first UAV 102 is posted at an intersection such as, for example, the first intersection 142, the first UAV 102 may remain at the first intersection 142 to provide notice of the presence of the emergency vehicle 122 for a threshold amount of time regardless if the identified vehicle heeds the alert and/or notice provided. In some examples, the threshold amount of time is until the emergency vehicle 122 arrives at the destination 126. In some examples, the threshold amount of time is until the emergency vehicle 122 passes the first intersection 142. In some examples, the threshold amount of time is until the emergency vehicle is a particular distance past the first intersection 142 and/or the first UAV 102.

To enable the route planner 124 to determine and/or update the emergency vehicle route 120 based on the traffic information obtained by the first UAV 102, in the illustrated example, the communicator 326 provides the route planner 124 with access to data generated by the traffic coordinator 128. For example, the communicator 326 of the traffic coordinator 128 provides the route planner 124 with data associated with the vehicles identified by the vehicle identifier 306, the direction that the identified vehicles are traveling and/or the rate that the identified vehicles are traveling. Additionally or alternatively, in some examples, the communicator 326 of the traffic coordinator 128 provides the route planner 124 with data associated with vehicle saturation on and/or adjacent the emergency vehicle route 120 and/or the responsiveness of the identified vehicles to the messages provided.

To further coordinate traffic within the coordination region 125 or otherwise, in some examples, the communicator 326 communicates with autonomous and/or connected vehicles and/or infrastructure (e.g., traffic lights). In some such examples, the communicator 326 causes traffic signals on and/or adjacent the emergency vehicle route 120 and/or within the coordination region 125 to provide the emergency vehicle 122 with the right of way (e.g., provide a green light for the emergency vehicle 120). For example, the communicator 326 may cause the traffic signals to generate signals that direct vehicles to exit the emergency vehicle route 120 and/or to not enter the emergency vehicle route 120. The traffic signals that are responsive to commands provided by the communicator 326 may be mounted at a fixed location (e.g., a post) and/or may be mobile. In examples in which the traffic signals are mobile, the traffic signals may be carried by UAVs including one or more of the first, second, third and/or fourth UAVs 102, 104, 106, 108 and/or other UAVS that manage traffic flow and/or reduce traffic saturation and/or congestion. In some examples, the communicator 326 causes traffic signals to redirect traffic off of the emergency vehicle route 1200, reduces a time period of a green light for vehicles entering the emergency vehicle route 120, increases a time period of a green light for vehicles exiting the emergency vehicle route 120 and/or increases a time period for a green light on the emergency vehicle route 120 to increase the speed of traffic.

While an example manner of implementing the traffic coordinator of FIG. 1 is illustrated in FIG. 1, one or more of the elements, processes and/or devices illustrated in FIG. 3 may be combined, divided, re-arranged, omitted, eliminated and/or implemented in any other way. Further, the example emergency vehicle route identifier 302, the example flight controller 303, the example emergency vehicle condition identifier 304, the example vehicle identifier 306, the example direction of travel identifier 308, the example rate of travel identifier 310, the example vehicle saturation identifier 312, the example message selector 314, the example display controller 316, the example visual messenger controller 320, the example audio messenger controller 322, the example vehicle responsiveness identifier 324, the example communicator 326, the example alerter 328 and/or, more generally, the example traffic coordinator 128 of FIG. 3 may be implemented by hardware, software, firmware and/or any combination of hardware, software and/or firmware. Thus, for example, any of the example emergency vehicle route identifier 302, the example flight controller 303, the example emergency vehicle condition identifier 304, the example vehicle identifier 306, the example direction of travel identifier 308, the example rate of travel identifier 310, the example vehicle saturation identifier 312, the example message selector 314, the example display controller 316, the example visual messenger controller 320, the example audio messenger controller 322, the example vehicle responsiveness identifier 324, the example communicator 326, the example alerter 328 and/or, more generally, the example traffic coordinator 128 of FIG. 3 could be implemented by one or more analog or digital circuit(s), logic circuits, programmable processor(s), application specific integrated circuit(s) (ASIC(s)), programmable logic device(s) (PLD(s)) and/or field programmable logic deice(s) (FPLD(s)). When reading any of the apparatus or system claims of this patent to cover a purely software and/or firmware implementation, at least one of the example emergency vehicle route identifier 302, the example flight controller 303, the example emergency vehicle condition identifier 304, the example vehicle identifier 306, the example direction of travel identifier 308, the example rate of travel identifier 310, the example vehicle saturation identifier 312, the example message selector 314, the example display controller 316, the example visual messenger controller 320, the example audio messenger controller 322, the example vehicle responsiveness identifier 324, the example communicator 326, the example alerter 328 and/or, more generally, the example traffic coordinator 128 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example traffic coordinator 128 of FIG. 1 may include one or more elements, processes and/or devices in addition to, or instead of, those illustrated in FIG. 3, and/or may include more than one of any or all of the illustrated elements, processes and devices.

Figure 4:
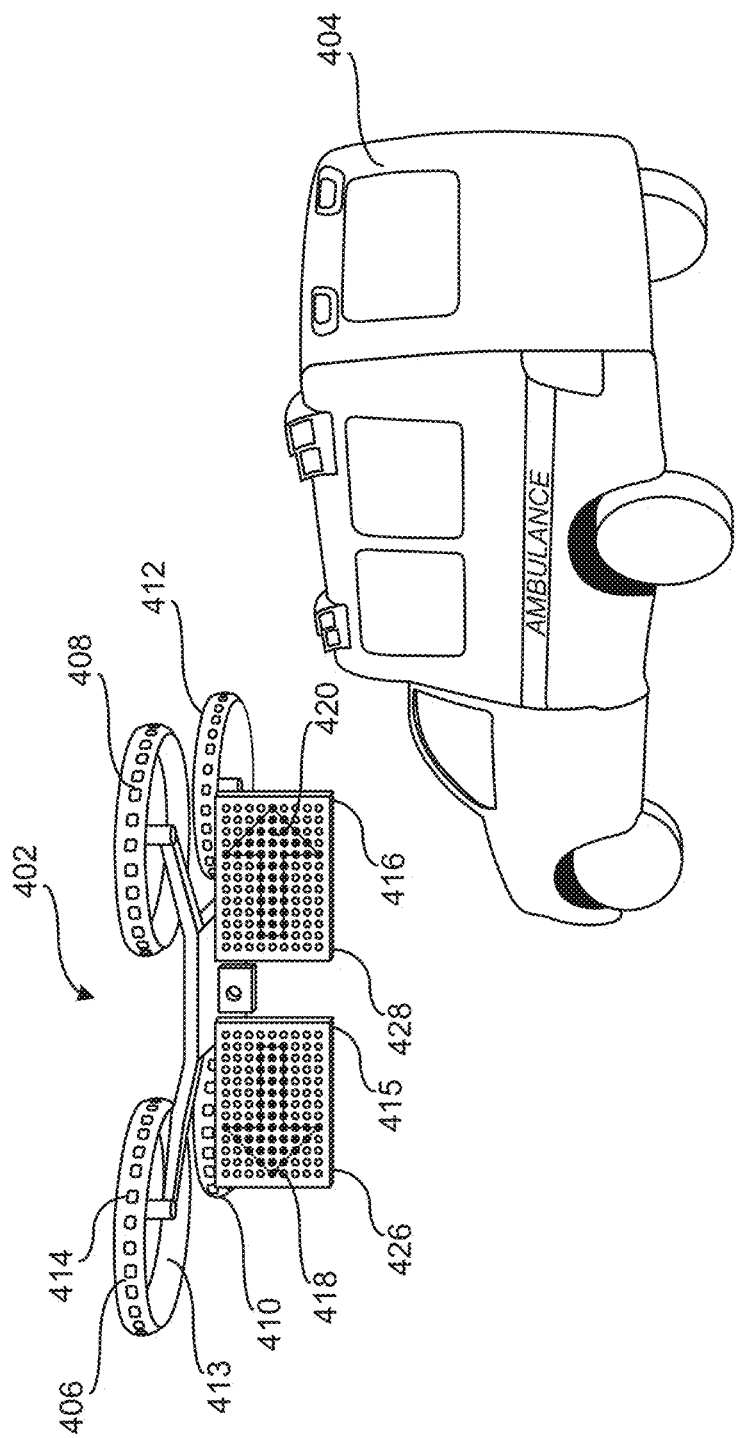
FIG. 4 is a schematic illustration of an example unmanned aerial vehicle and an example emergency vehicle in accordance with the teachings of this disclosure.

FIG. 4 illustrates an example UAV 402 that can be used to implement one or more of the first, second, third and/or fourth UAVs 102, 104, 106, 108 of FIG. 1 and an example emergency vehicle 404 that can be used to implement emergency vehicle 122 of FIG. 1. In the illustrated example, the UAV 402 includes a first engine 406, a second engine 408, a third engine 410 and a fourth engine 412 that are used to propel the UAV 402 along the emergency vehicle route 120 and/or to cause the UAV 402 to hover at a location on and/or adjacent the emergency vehicle route 120. To enable the UAV 402 to be more visible to vehicles and/or motorists and/or to enable messages to be conveyed, in the illustrated example, the engines 406, 408, 410, 412 include annular portions 413 having lights or displays 414 that may be used to implement the visual messenger 138 of FIG. 1. The displays may be implemented with LED lights.

In some examples, the engines 406, 408, 410, 412 propel the UAV 402 until the UAV 402 identifies a vehicle on and/or adjacent the emergency vehicle route 120 and/or within the coordination region 125. When the UAV 402 identifies a vehicle on and/or adjacent the emergency vehicle route 120, the engines 406, 408, 410, 412 are structured to cause the UAV 402 to hover adjacent the identified vehicle to enable one or more messages to be provided via example displays 415, 416. In this example, the displays 415, 416 include messages (e.g., opposing arrows) 418, 420 that encourage the identified vehicles along the emergency vehicle route 120 to make way for the approaching emergency vehicle 404.

To deter the displays 415, 416 from affecting the aerodynamics of the UAV 104, in some examples, the displays 415, 416 are retractable and/or rotatable between a stowed position and a deployed position. In the deployed position, in some examples, the displays 415, 416 are hung to enable the messages 418, 420 to be directed toward a vehicle identified on and/or adjacent the emergency vehicle route 120 and/or to enable the messages 418, 420 to be received by the identified vehicle. FIG. 4 illustrates the displays 415, 416 in the deployed position.

In the stowed position, in some examples, the displays 415, 416 are retracted and/or rotated to increase the aerodynamics of the first UAV 402. For example, in the stowed position, an end 426 of the first display 415 may be positioned adjacent one of the first or third engines 406, 410 and/or an end 428 of the second display 416 may be positioned adjacent one of the second or fourth engines 408, 412.

Figure 5:
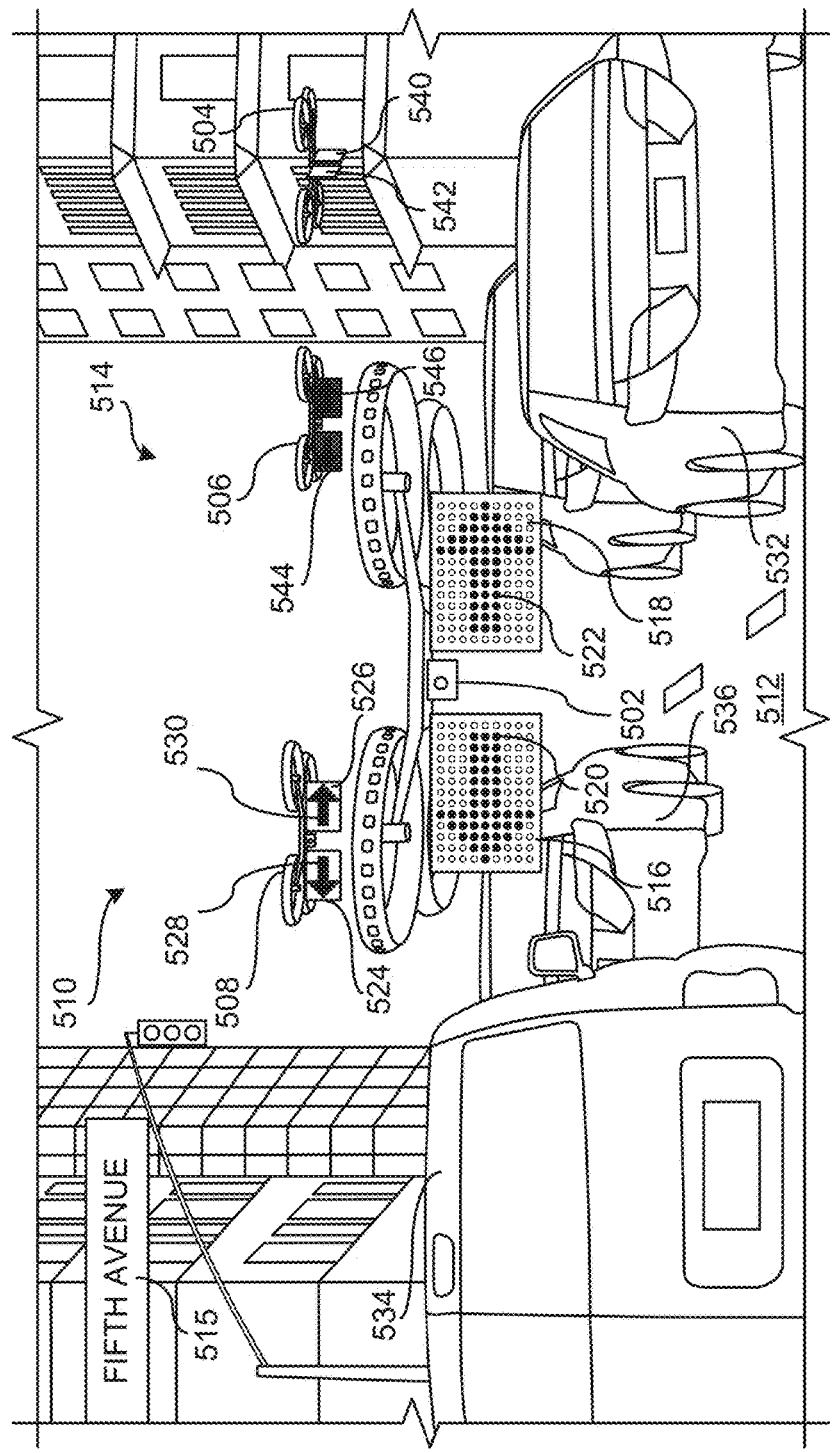
FIG. 5 is a schematic illustration of example unmanned aerial vehicles coordinating traffic in a first scenario in accordance with the teachings of this disclosure.

FIG. 5 illustrates example first, second, third and fourth UAVs 502, 504, 506, 508 coordinating traffic 510 on twenty seventh street 512 along which an example emergency vehicle route traverses. The first, second, third and fourth UAVs 502, 504, 506, 508 can be used to implement the first, second, third and/or fourth UAVS 102, 104, 106, 108 of FIG. 1. FIG. 5 also illustrates an intersection 514 between twenty seventh street 512 and fifth avenue 515, where both twenty seventh street 512 and fifth avenue 515 are one-way streets. In the illustrated example, the first and fourth UAVs 502, 508 are shown directing and/or coordinating traffic on twenty seventh street 512 and the second and third UAVs 504, 506 are shown directing and/or coordinating traffic at the intersection 514.

In this example, the first UAV 502 includes example displays 516, 518 displaying opposing arrows 520, 522 and the fourth UAV 508 includes example displays 524, 526 displaying opposing arrows 528, 530. Thus, the displays 516, 518, 524, 526 in this example collectively encourage vehicles 532, 534, 536 on the twenty seventh street 512 to provide a lane for an emergency vehicle to traverse and/or to encourage the vehicles to exit twenty seventh street 512. Also, in this example, the second UAV 504 includes example displays 540, 542 displaying a solid color (e.g., red) and the third UAV 508 includes example displays 544, 546 displaying a solid color (e.g., red). Thus, the displays 540, 542, 544, 546 in this example collectively encourage vehicles traveling toward the intersection 514 on fifth avenue 515 to stop, to not enter twenty seventh street 512 and/or to not traverse twenty seventh street 512. In other words, in the illustrated example, the first, second, third and fourth UAVs 502, 504, 506, 508 work together to coordinate the traffic 510 along twenty seventh street 512, here, the emergency vehicle route, to enable an emergency vehicle to reach its destination in a timely and/or safe manner. While the above example describes the displays 516, 518, 524, 526, 540, 542, 544, 546 conveying particular messages, the example displays 516, 518, 524, 526, 540, 542, 544, 546 may provide any message.

Figure 6:
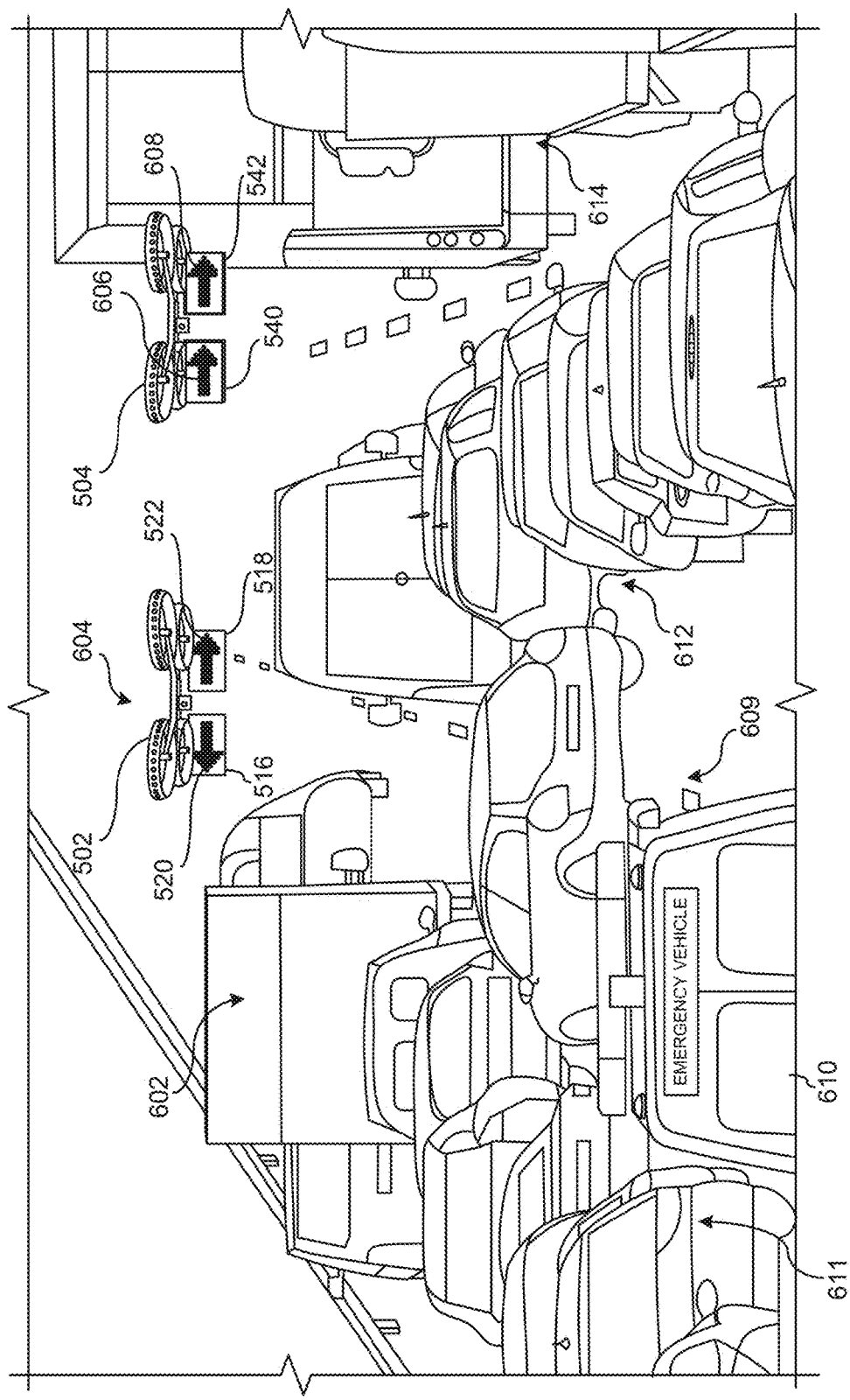
FIG. 6 is another schematic illustration of some of the example unmanned aerial vehicles of FIG. 5 coordinating traffic in a second scenario in accordance with the teachings of this disclosure.

FIG. 6 illustrates the example first and second UAVs 502, 504 coordinating traffic 602 on a highway 604 along which an example emergency vehicle route traverses. In this example, the highway 604 is a one-way highway, the example displays 516, 518 of the first UAV 502 are displaying the opposing arrows 520, 522 and the example displays 540, 542 of the second UAV 102 are displaying arrows 606, 608 pointing in the same direction (e.g., to the right). In the illustrated example, to provide a free lane 609 for an emergency vehicle 610 to traverse, the display 516 of the first UAV 502 encourages a first lane 611 of the traffic 602 to move in a direction generally represented by the arrow 520 (e.g., to the left) and the displays 518, 540, 542 of the first and second UAVs 502, 504 encourage second and third lanes 612, 614 of the traffic 602 to move in a direction generally represented by the arrows 522, 606, 608 (e.g., to the right). In other words, the first and second UAVs 502, 504 work together to coordinate the traffic 602 along the highway 604, here, the emergency vehicle route, to enable the emergency vehicle 610 to reach its destination in a timely and/or safe manner.

Figure 7A:
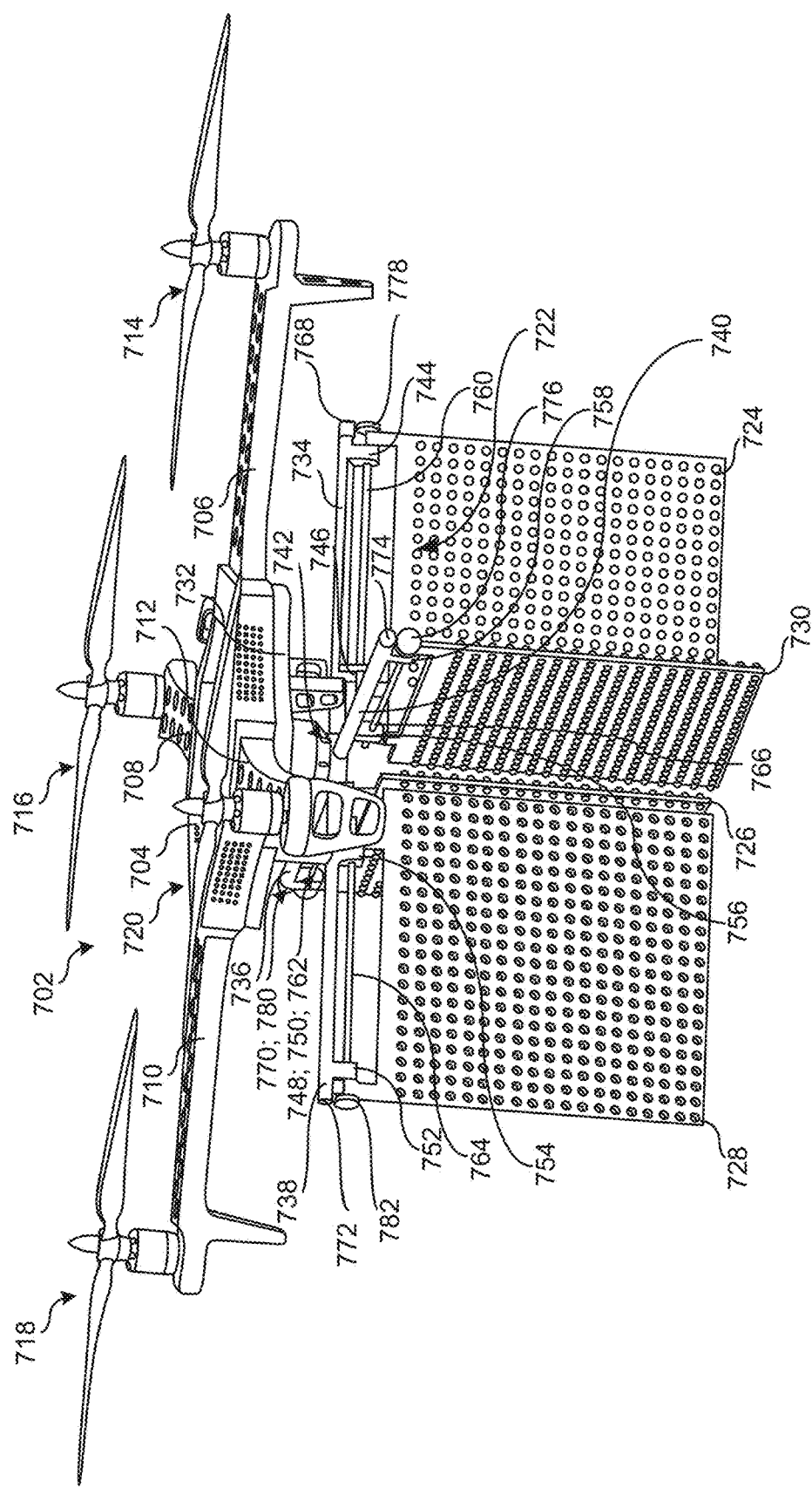
FIG. 7A illustrates an example unmanned aerial vehicle that can be used to implement the example unmanned aerial vehicles of FIG. 1, where the example unmanned aerial vehicle of FIG. 7A includes an example first display assembly in a first position.

FIG. 7A illustrates an example UAV 702 that can be used to implement the first, second, third and/or fourth UAV 102, 104, 106, 108 of FIG. 1. In this example, the UAV 702 includes a body 704 from which arms 706, 708, 710, 712 extend. The example arms 706, 708, 710, 712 include example engines and/or propellers 714, 716, 718, 720 having no annular portions surrounding the propellers 714, 716, 718, 720 (e.g., compare to FIG. 4). However, in other examples, the propellers 714, 716, 718, 720 are surrounded by annular portions including messaging capabilities (e.g., lights, displays, etc.).

Figure 8:
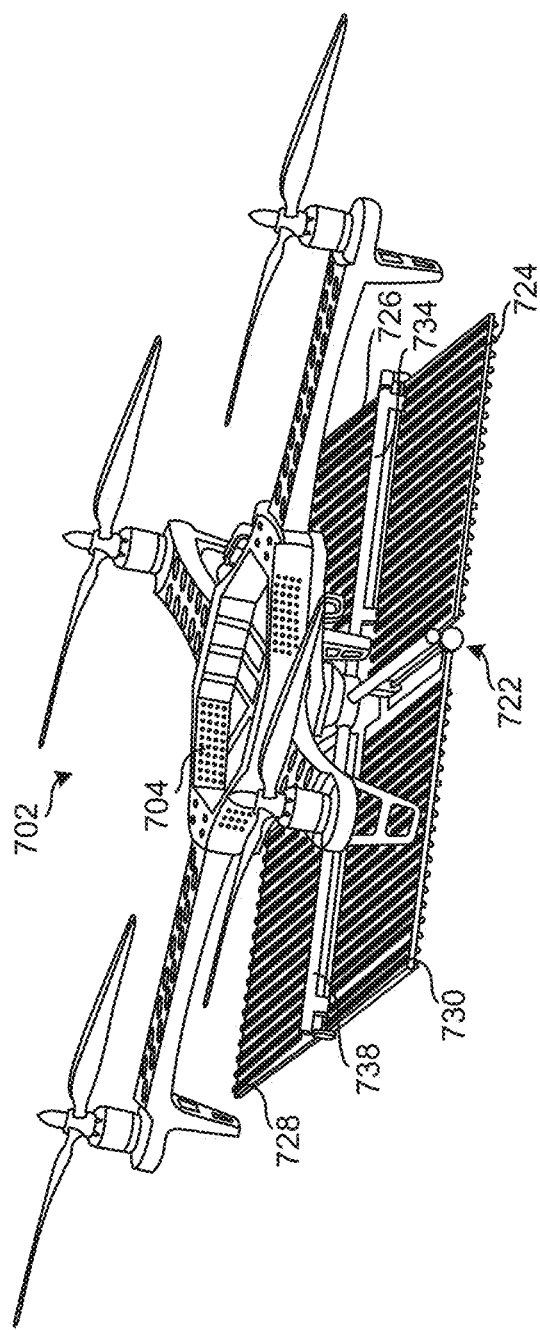
FIG. 8 illustrates the example unmanned aerial vehicle of FIG. 7A including example displays of the first display assembly in a second position.

In the illustrated example, the UAV 702 is carrying an example display assembly 722 including first, second, third and fourth displays 724, 726, 728, 730 that are actuatable between a deployed position shown in FIG. 7A and a stowed position shown in FIG. 8. To enable the displays 724, 726, 728, 730 to be coupled to an example support base 732 of the display assembly 722, in this example, example first, second, third and fourth support arms 734, 736, 738, 740 extend from an example coupling 742 of the support base 732.

To rotatably couple the displays 724, 726, 728, 730 to the support arms 734, 736, 738, 734 in the example of FIG. 7A, the support arms 734, 736, 738, 740 include example devises 744, 746, 748, 750, 752, 754, 756, 758 that receive elongated members 760, 762, 764, 766 of the respective displays 724, 726, 728, 730. To actuate the displays 724, 726, 728, 730 between the lowered/deployed position and the raised/stowed position, in the illustrated example, the support arms 734, 736, 738, 740 carry motors 902 (FIG. 9) that rotate first gears 768, 770, 772, 774 that interface with second gears 776, 778, 780, 782 at the end of the respective elongated members 760, 762, 764, 766. In operation, rotating the motors 902 and the corresponding gears 768, 770, 772, 774, 776, 778, 780, 782 in a first direction moves the displays 724, 726, 728, 730 clockwise and rotating the motors 902 and the corresponding gears 768, 770, 772, 774, 776, 778, 780, 782 in a second direction moves the displays 724, 726, 728, 730 counterclockwise. To enable the rotational position of the arms 734, 736, 738, 740 to change relative to the support base 732, in some examples, the coupling 742 carries an example motor 904 (FIG. 9) and/or an example crank 906 (FIG. 9) that, when driven, rotate the arms 734, 736, 738, 740.

Figure 7C:
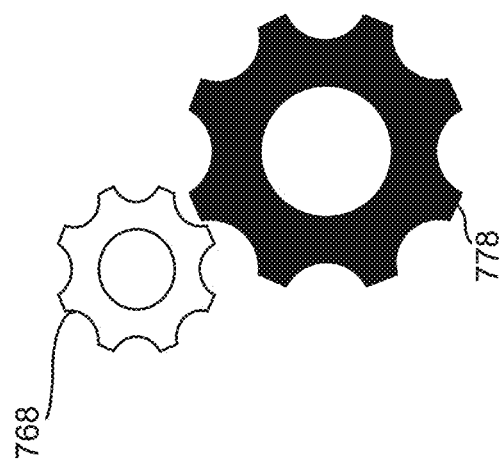
FIGS. 7B and 7C illustrate different views of an example motor assembly that can be used to implement the unmanned aerial vehicle of FIG. 7A.
Figure 7B:
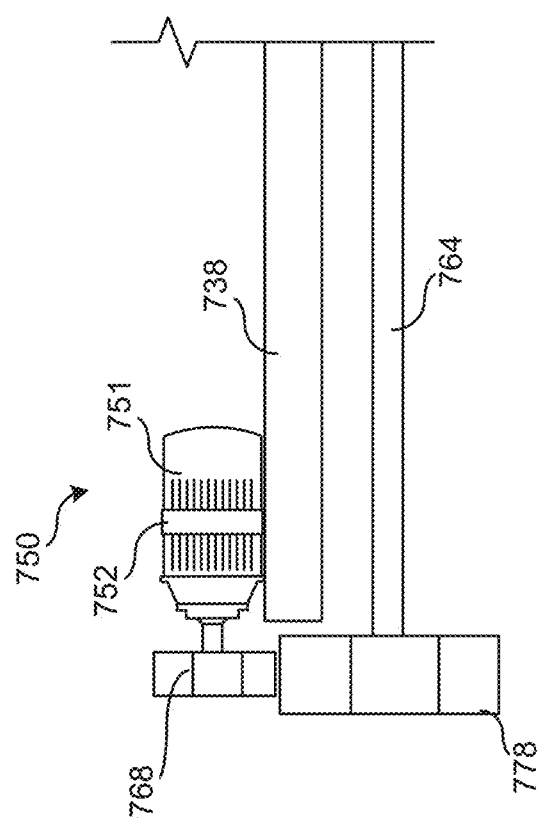

FIG. 7B illustrates a detailed view of an example motor assembly 750 that can be used to implement the motor 902, the first gear 768 and the second gear 778. FIG. 7C illustrates an end view of an interface between the first and second gear 768, 778. As shown in FIGS. 7B and 7C, in this example, the motor assembly 750 includes an example motor 751 coupled to the support arm 738 via an example bracket 752 and the first gear 768 is smaller than the second gear 778. By sizing the first and second gears 768, 778 differently, the interaction between the gears 768, 778 enable the resultant torque felt at the elongated member 764 to be greater than a torque output by the motor 751. FIG. 8 illustrates the example UAV 702 with the displays 724, 726, 728, 730 in the stowed position.

Figure 9:
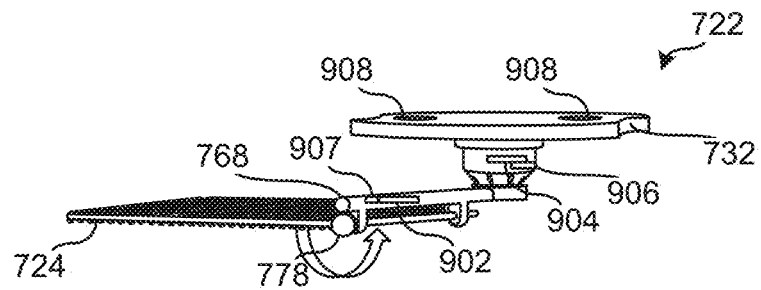
FIGS. 9-11 illustrate processes of moving an example display of the example first display assembly of FIG. 7A between a stowed position and a deployed position.
Figure 10:
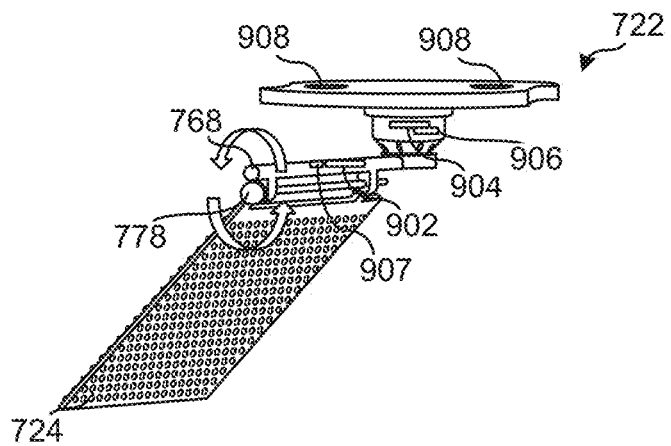
Figure 11:
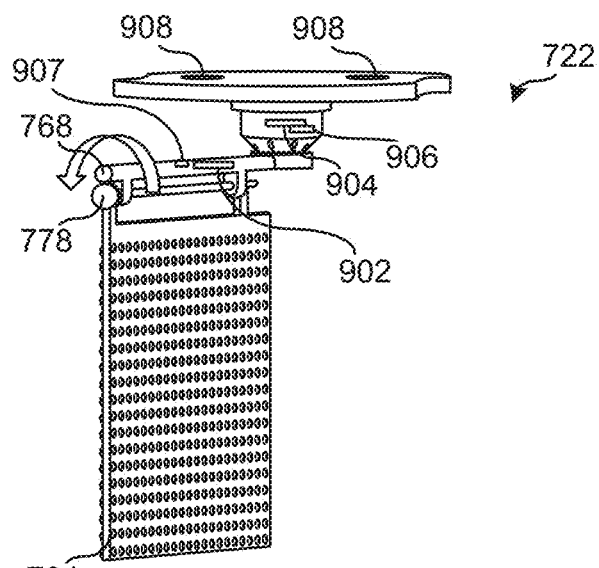

FIG. 9 illustrates a portion of example display assembly 722 of FIG. 7A including the example first display 724 in the raised position. As shown in FIG. 9, the display assembly 722 includes the support base 732 defining slots 908 to receive fasteners to couple the support base 732 to the UAV 702. FIG. 10 illustrates the motor 902 rotating the first gear 768 and the first gear 768 driving the second gear 778 and the first display 724 counterclockwise. In some examples, a transmission and/or other gear reduction mechanism 907 is included to increase a resultant torque output by the motor 902 to move the first display 724. In some examples, an encoder or other sensor is included to monitor the position of the first display 724. FIG. 11 illustrates the first display 724 in the lowered position.

Figure 12:
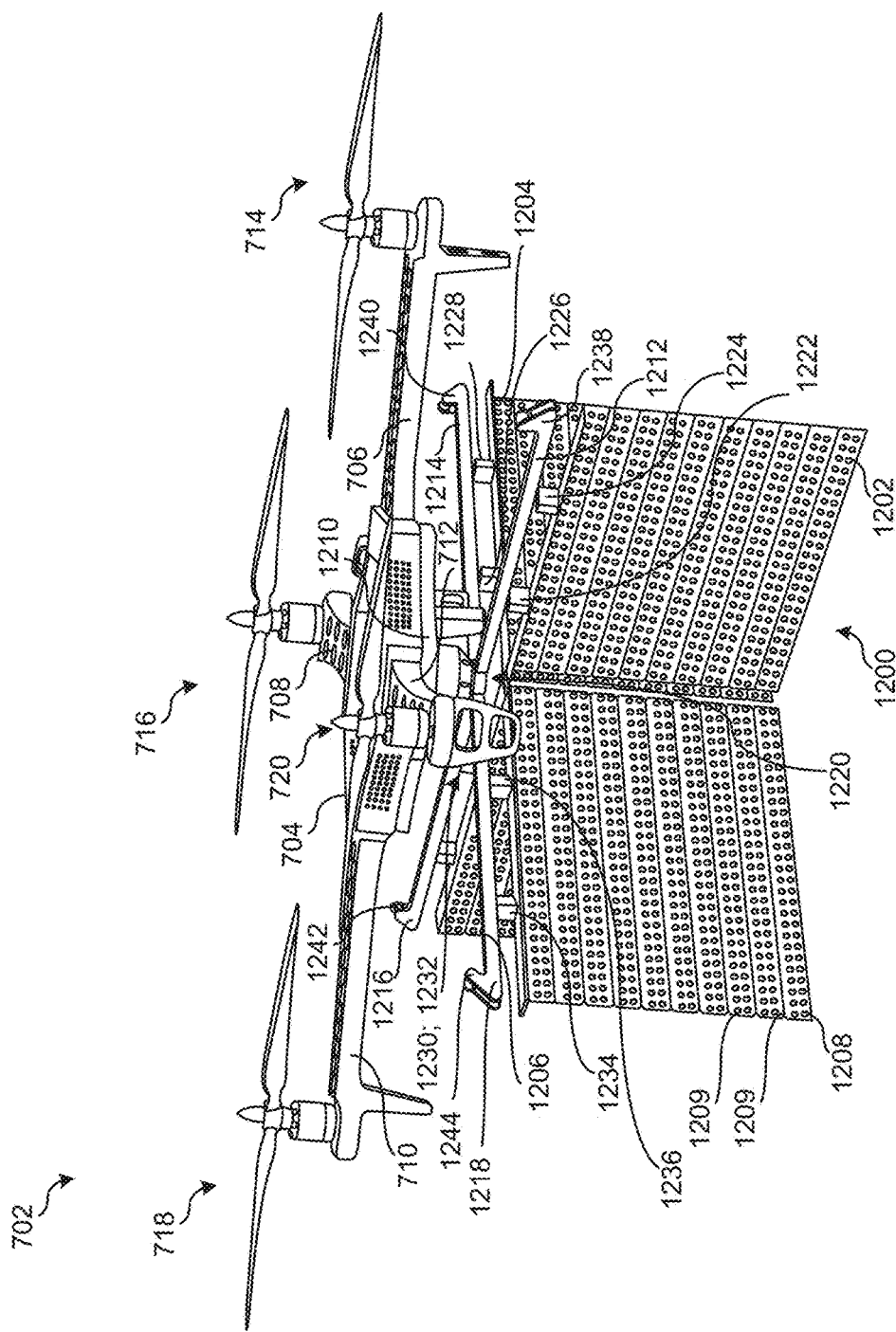
FIG. 12 illustrates an example unmanned aerial vehicle that can be used to implement the example unmanned aerial vehicles of FIG. 1, where the unmanned aerial vehicle of FIG. 12 includes an example second display assembly in a first position.

FIG. 12 illustrates the example UAV 702 including an alternative example display assembly 1200 including first, second, third and fourth example displays 1202, 1204, 1206, 1208. In this example, the displays 1202, 1204, 1206, 1208 are actuatable between a lowered position shown in FIG. 12 and a raised position shown in FIG. 14. In contrast to the displays 724, 726, 728, 730 of FIG. 7A, the displays 1202, 1204, 1206, 1208 of FIG. 12 include panels and/or display segments 1209 to enable the displays 1202, 1204, 1206, 1208 to be foldable onto themselves for storage. The panels 1209 may be similarly or differently sized and/or shaped. In examples in which the displays 1202, 1204, 1206, 1208 include fabric, the fabric may carry LEDs.

To enable the displays 1202, 1204, 1206, 1208 to be coupled to an example support base 1210 of the example display assembly 1200, in this example, example first, second, third and fourth arms 1212, 1214, 1216, 1218 extend from an example coupling 1220 of the support base 1210. As shown in the example of FIG. 12, standoffs 1222, 1224, 1226, 1228, 1230, 1232, 1234, 1236 couple the arms 1212, 1214, 1216, 1218 and the respective displays 1202, 1204, 1206, 1208.

To actuate the displays 1202, 1204, 1206, 1208 between the lowered position and the raised position, the example arms 1212, 1214, 1216, 1218 include example pulleys 1238, 1240, 1242, 1244 that guide cords 1502 (FIGS. 15-17) toward apertures 1504 (FIGS. 16, 17) defined on sides of the displays 1202, 1204, 1206, 1208. To wind and/or unwind the cords 1502 to enable the displays 1202, 1204, 1206, 1208 to be raised or lowered, in some examples, the arms 1212, 1214, 1216, 1218 carry motors 1505 that drive spools and/or pulleys 1506 (FIGS. 15-17) to which the cords 1502 are coupled. In operation, rotating the motors in a first direction lowers the displays 1202, 1204, 1206, 1208 and rotating the motors in a second direction raises the displays 1202, 1204, 1206.

Figure 13:
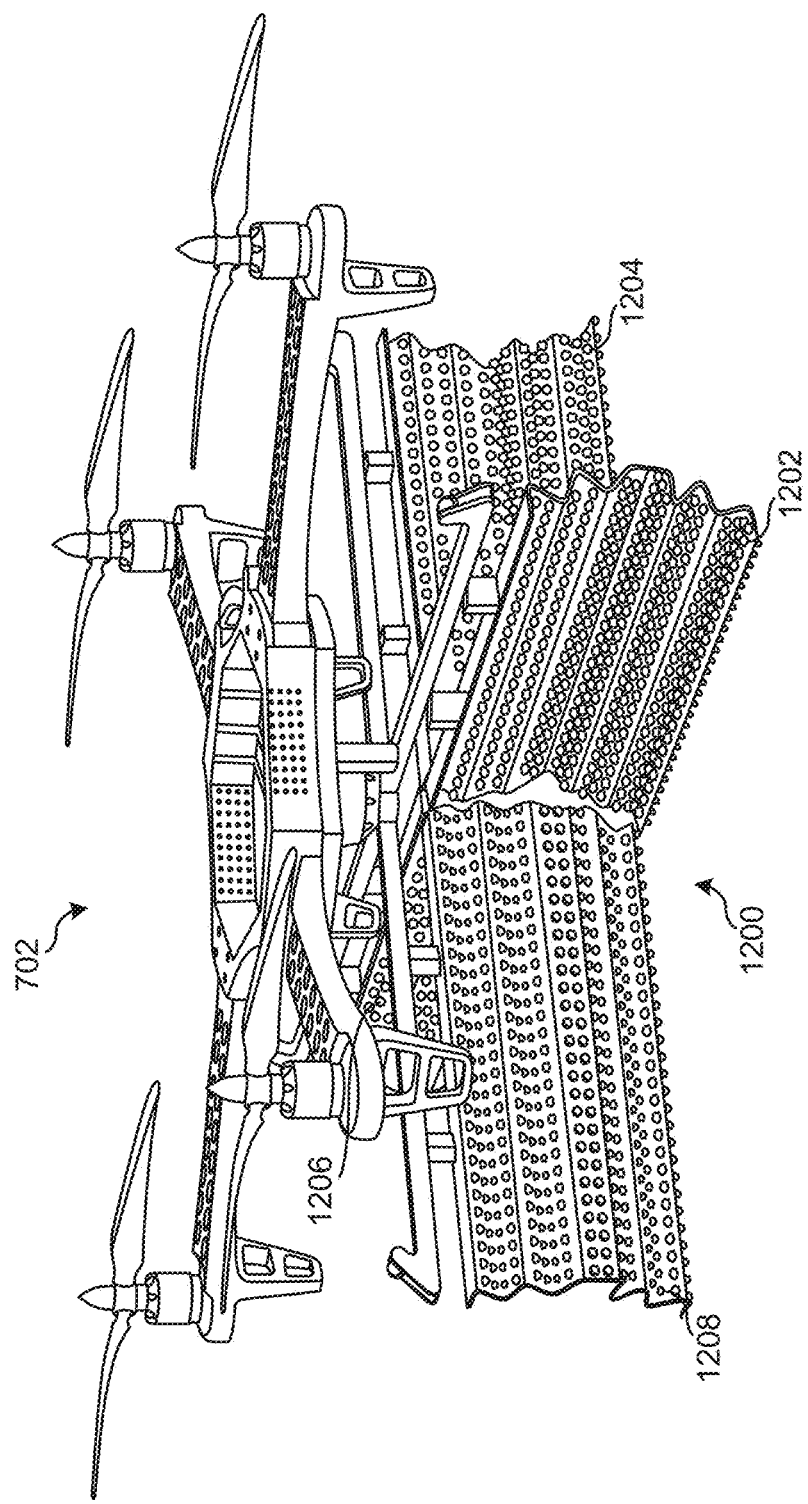
FIG. 13 illustrates the example unmanned aerial vehicle of FIG. 12 including example displays of the example second display assembly in a second position.
Figure 14:
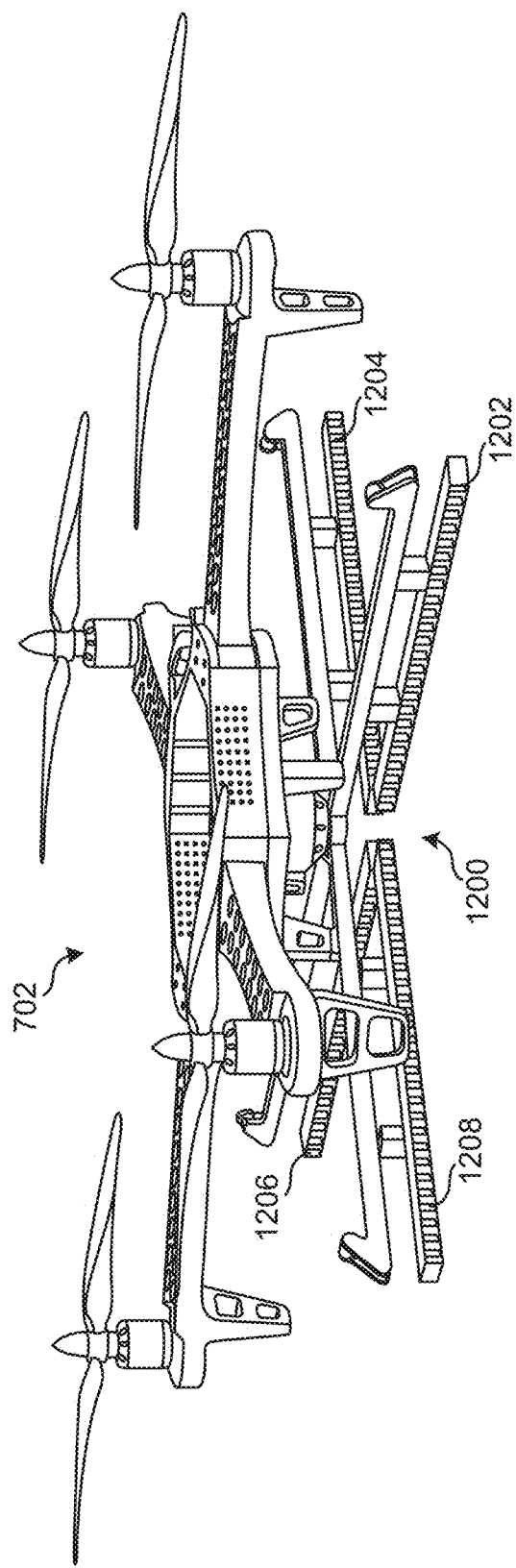
FIG. 14 illustrates the example unmanned aerial vehicle of FIG. 12 including example displays of the example second display assembly in a third position.

To enable the rotational position of the arms 1212, 1214, 1216, 1218 to change relative to the support base 1210, in some examples, the coupling 1220 carries an example motor 1508 (FIG. 15) and/or an example crank 1510 (FIG. 15) that, when driven, rotate the arms 1212, 1214, 1216, 1218. FIG. 13 illustrates the example UAV 702 with the displays 1202, 1204, 1206, 1208 partially raised and/or moving toward the stowed position or the deployed position. FIG. 14 illustrates the example UAV 702 with the displays 1202, 1204, 1206, 1208 in the stowed position.

Figure 15:
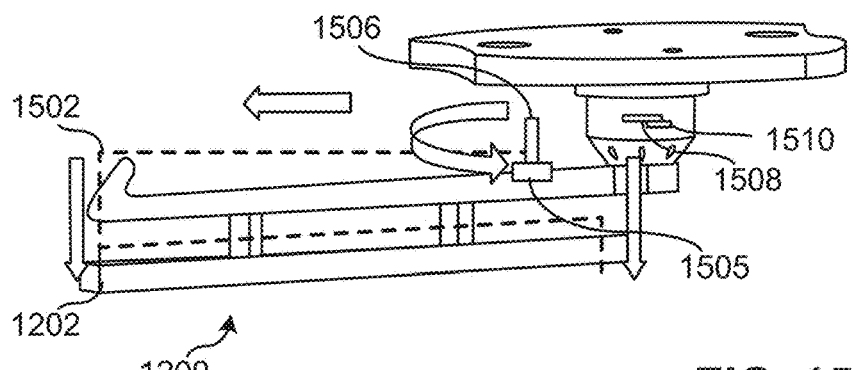
FIGS. 15-17 illustrate processes of moving an example display of the example second display assembly of FIG. 12 between a stowed position and a deployed position.
Figure 16:
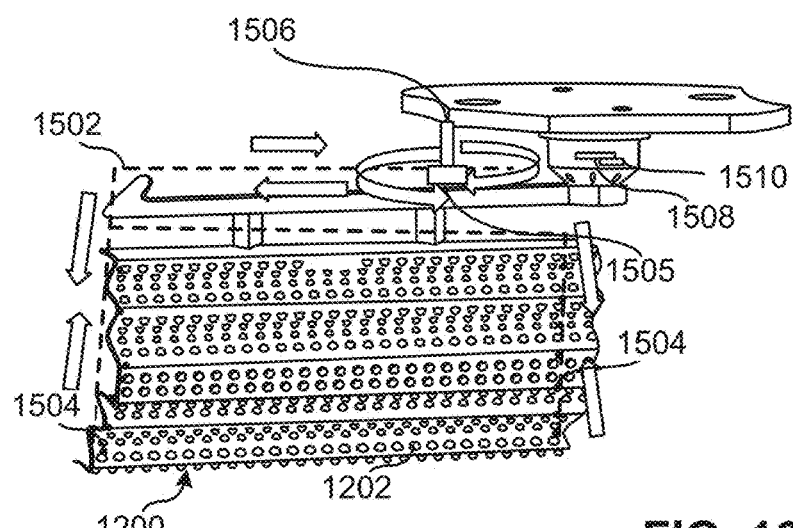
Figure 17:
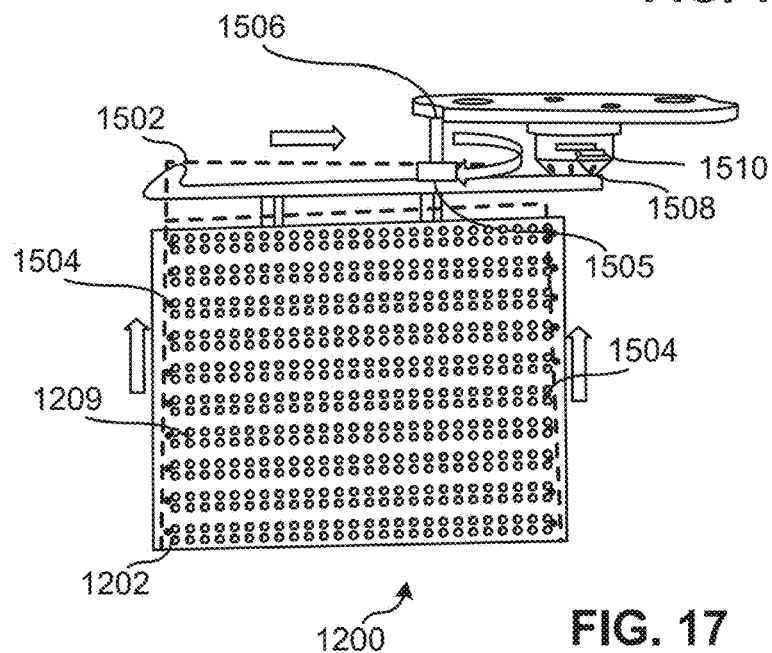

FIG. 15 illustrates a portion of example display assembly 1200 including the example first display 1202 in the raised or stowed position. FIG. 16 illustrates the motor 1505 rotating the cable 1502 to lower or raise the display 1202. In this example, rotating the motor 1505 in a first direction lowers the display 1202 and rotating the motor 1505 in a second direction raises the display 1202. FIG. 17 illustrates the first display 1202 in the lowered position.

Figure 18:
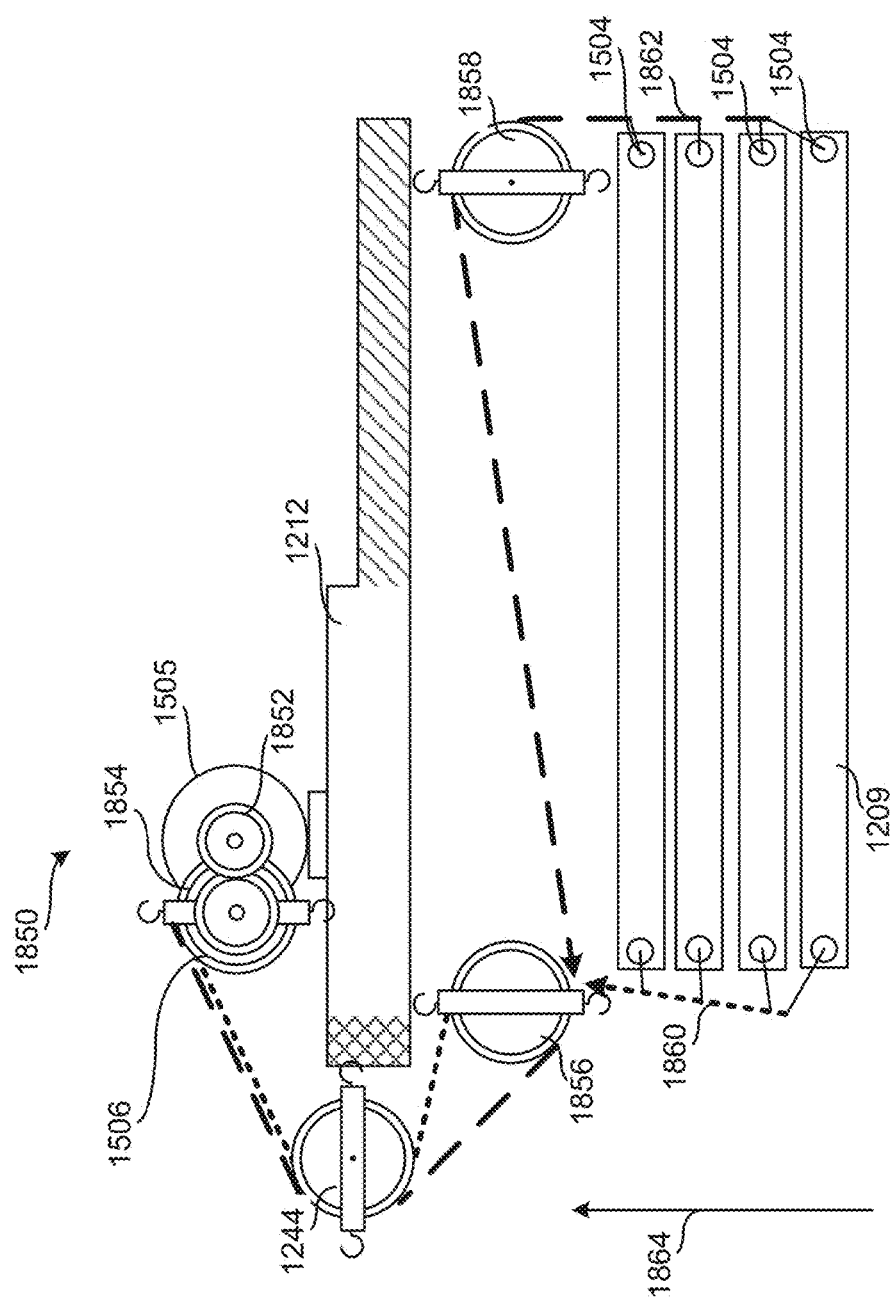
FIG. 18 illustrates a view of an example motor assembly that can be used to implement the unmanned aerial vehicle of FIG. 12.

FIG. 18 illustrates a detailed view of an example motor assembly 1850 that can be used to implement the motor 1505, the pulley 1244 and the spindle 1506 of FIG. 15. In the illustrated example, an example first gear 1852 is driven by the motor 1505 that interfaces with an example second gear 1854 coupled to the spindle 1506. Thus, in this example, rotation of the motor 1505, rotates the first and second gears 1852, 1854 and the spindle 1506. In some examples, the first gear 1852 is smaller than the second gear 1854 to enable a resultant torque felt when rotating the spindle 1506 to be greater than a torque output by the motor 902.

In this example, example pulleys 1244, 1856, 1858 are coupled to the support arm 1212 to direct first and second cables 1860, 1862 along sides of the panels 1209 and through the apertures 1504. In operation, the first and second cables 1860, 1862 are coupled to the spindle 1506 and the panels 12009 such that rotating the spindle 1506, via the motor 1505, in a first direction draws the panels 1209 in a direction generally indicated by arrow 1864 to position the display 1204 in the stowed position and rotating the spindle 1506, via the motor 1505, in a second direction enables the panels 1209 to move in a direction generally opposite of the direction indicated by arrow 1864 to position the display 1204 in the deployed position.

Figure 19:
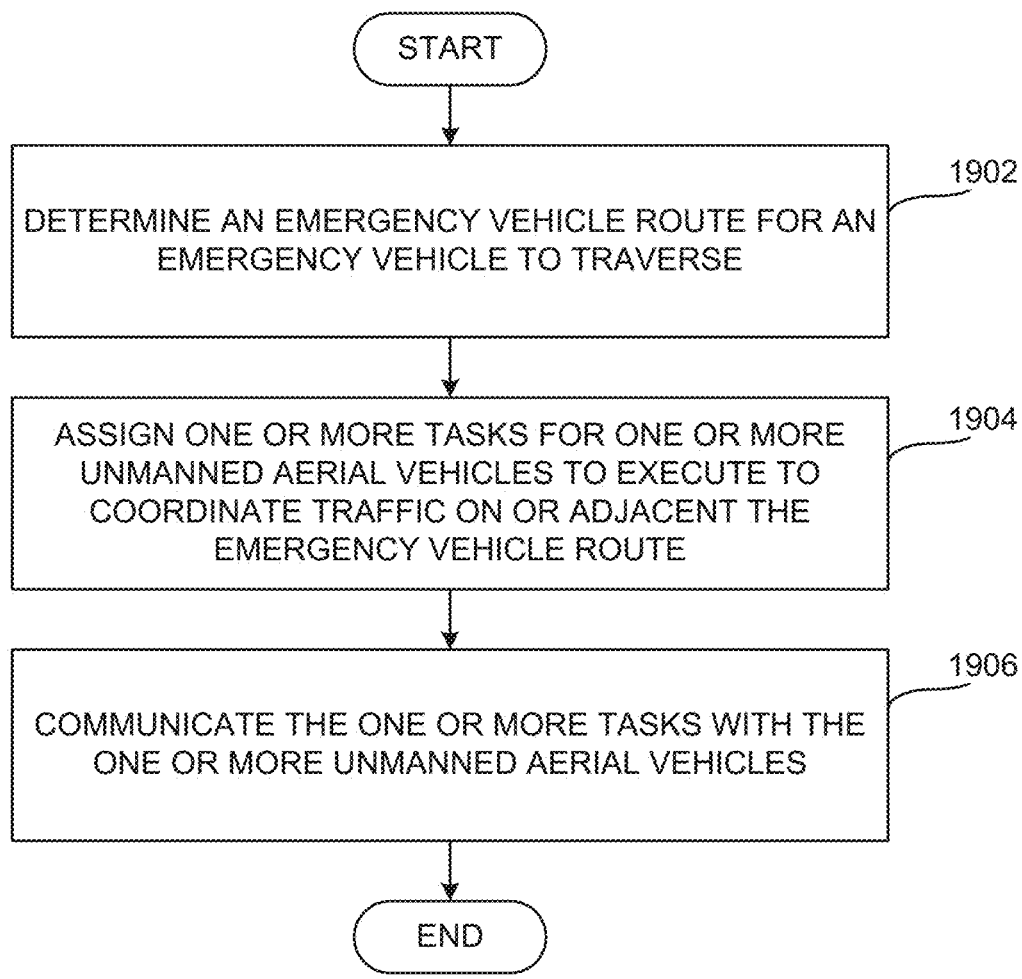
FIGS. 19 and 20 are flowcharts representing example machine-readable instructions that may be executed to implement the example route planner of FIG. 2.
Figure 20:
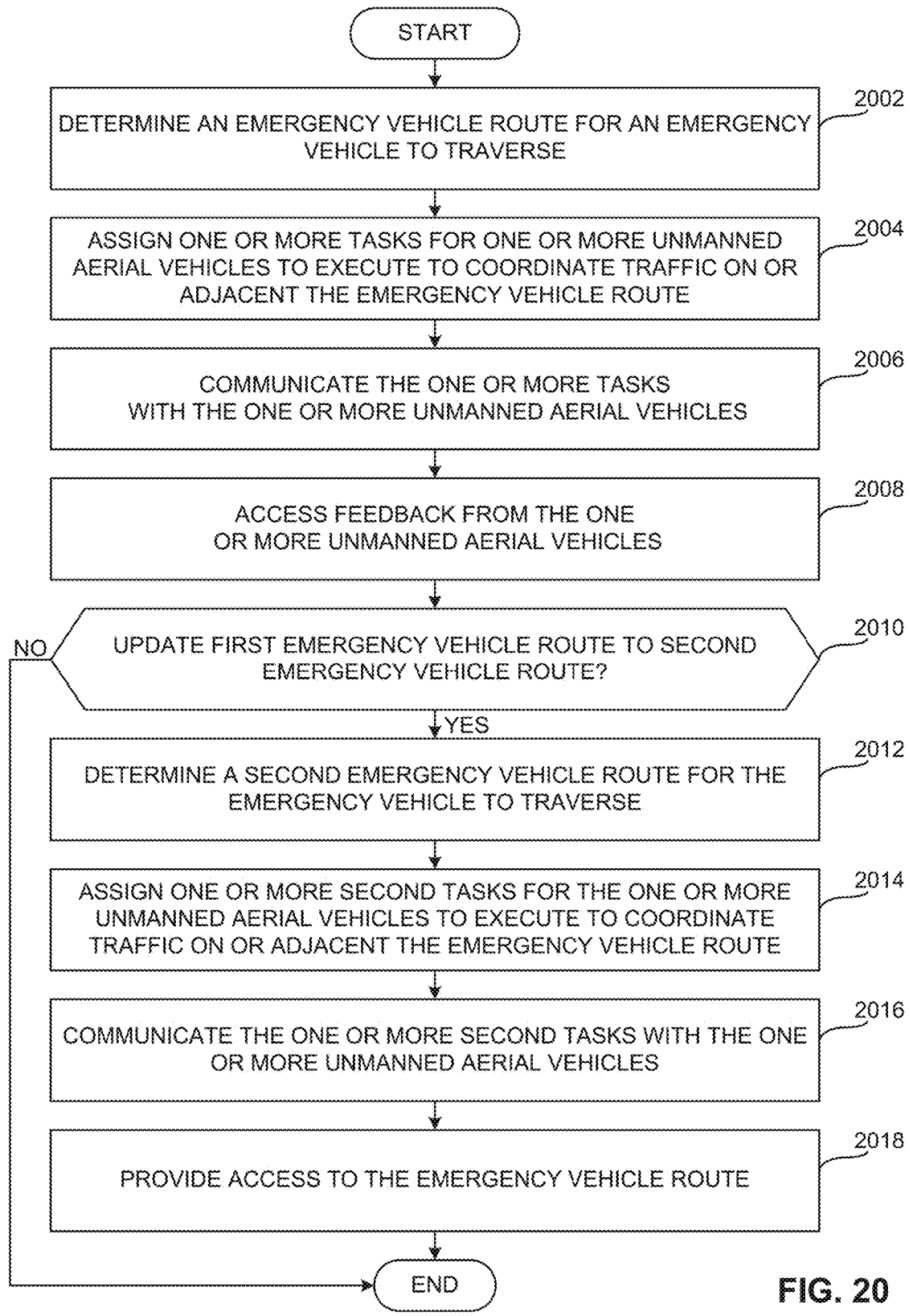
Figure 21:
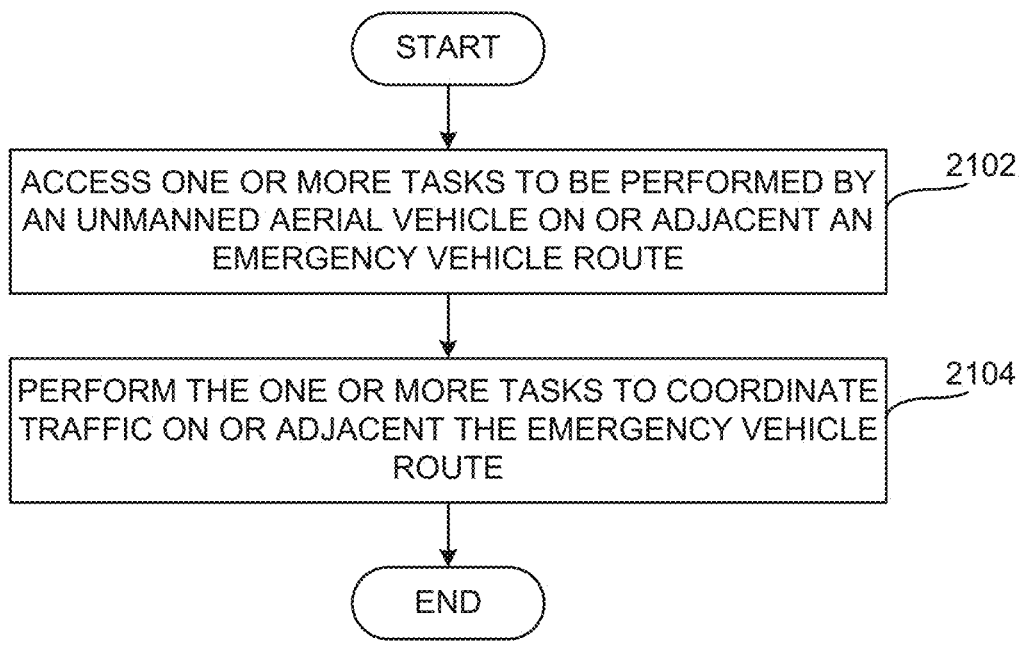
FIGS. 21 and 22 are flowcharts representing example machine-readable instructions that may be executed to implement the example traffic coordinator of FIG. 2.
Figure 22:
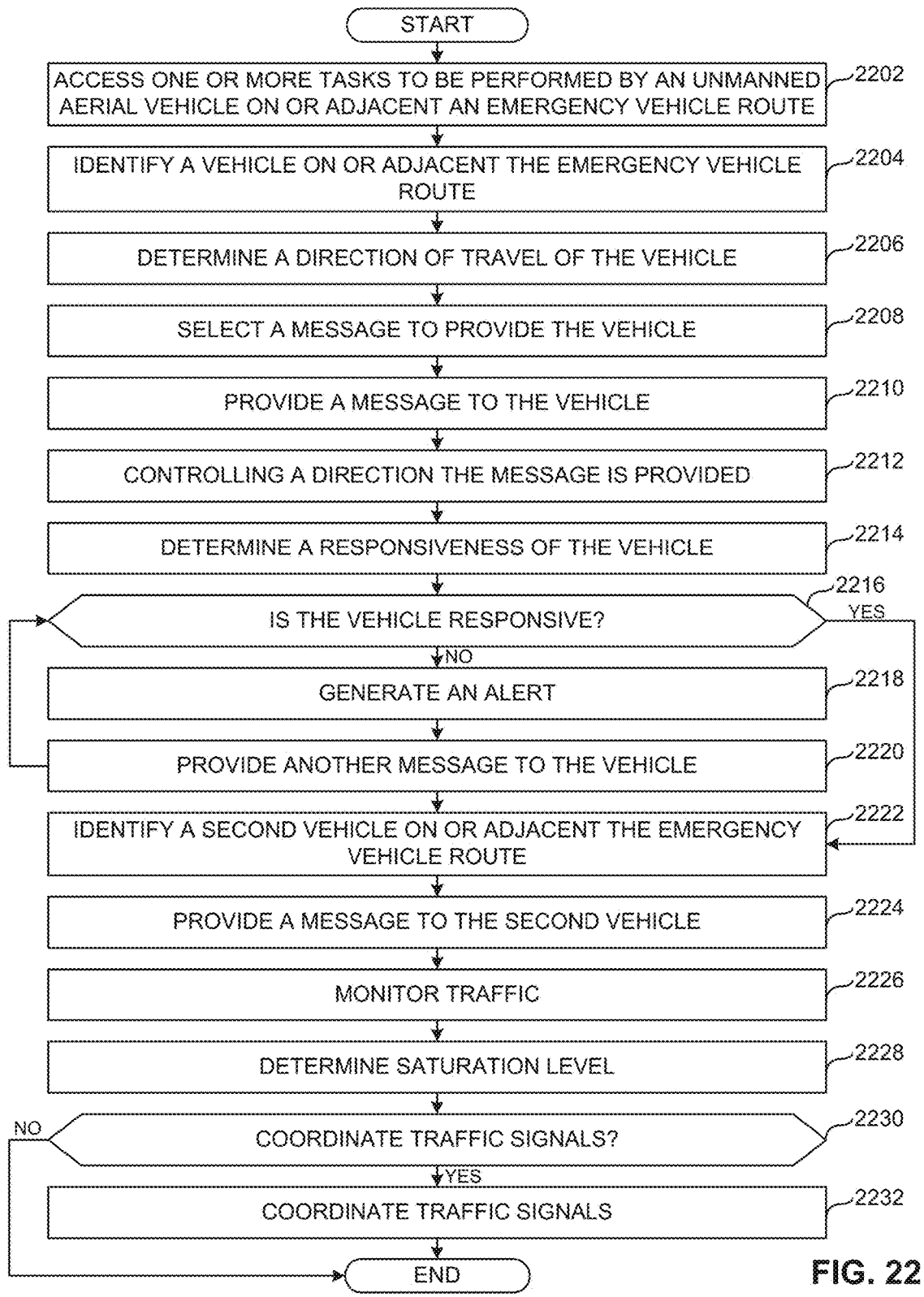

Flowcharts representative of example machine readable instructions for implementing the route planner 124 of FIG. 2 is shown in FIGS. 19 and 20 and example machine readable instructions for implementing the traffic coordinator 128 of FIG. 3 is shown in FIGS. 21 and 22. In this example, the machine readable instructions comprise a program for execution by a processor such as the processors 2312, 2412 shown in the example processor platforms 2300, 2400 discussed below in connection with FIGS. 23, 24. The program may be embodied in software stored on a non-transitory computer readable storage medium such as a CD-ROM, a floppy disk, a hard drive, a digital versatile disk (DVD), a Blu-ray disk, or a memory associated with the processors 2312, 2412, but the entire program and/or parts thereof could alternatively be executed by a device other than the processors 2312, 2412 and/or embodied in firmware or dedicated hardware. Further, although the example program is described with reference to the flowcharts illustrated in FIG. 19-22, many other methods of implementing the example route planner 124 and the example traffic coordinator 128 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 19-22 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program of FIG. 19 begins at block 1902 with the emergency vehicle route determiner 204 determining an emergency vehicle route 120 for an emergency vehicle 122 to traverse. Based on the emergency vehicle route, the aerial vehicle coordinator 208 assigns one or more tasks for one or more of the unmanned aerial vehicles 102, 104, 106, 108 to execute to coordinate traffic on or adjacent the emergency vehicle route 120 (block 1904). The communicator 210 communicates the one or more tasks with the one or more unmanned aerial vehicles 102, 104, 106, 108 (block 1906).

The program of FIG. 20 begins at block 2002 with the emergency vehicle route determiner 204 determining an emergency vehicle route 120 for an emergency vehicle 122 to traverse. Based on the emergency vehicle route 120, the aerial vehicle coordinator 208 assigns one or more tasks for one or more of the unmanned aerial vehicles 102, 104, 106, 108 to execute to coordinate traffic on or adjacent the emergency vehicle route 120 (block 2004). The communicator 210 communicates the one or more tasks with the one or more unmanned aerial vehicles 102, 104, 106, 108 (block 2006).

The emergency vehicle route updater 206 accesses feedback from one or more of the unmanned aerial vehicles 102, 104, 106, 108 (block 2008). At block 2010, the emergency vehicle route updater 206 determines whether to update the emergency vehicle route 120 to a second emergency vehicle route based on the feedback (block 2010). In some examples, the feedback includes data regarding traffic on or adjacent the emergency vehicle route 120. In some examples, the emergency vehicle route updater 206 determines to update the emergency vehicle route 120 based on a travel time to a destination for the emergency vehicle 122 being less by the emergency vehicle 122 taking the second emergency vehicle route than by the emergency vehicle 122 taking the first emergency vehicle route.

Based on the determination to update the emergency vehicle route 120 to the second emergency vehicle route, the emergency vehicle route determiner 204 determines the second emergency vehicle route for the emergency vehicle 120 to traverse (block 2012) and the aerial vehicle coordinator 208 assigns one or more second tasks for one or more of the unmanned aerial vehicles 102, 104, 106, 108 to execute to coordinate traffic on or adjacent the second emergency vehicle route (block 2014). The communicator 210 communicates the one or more second tasks with the one or more unmanned aerial vehicles 102, 104, 106, 108 (block 2016). The communicator 210 enables access to the emergency vehicle route 120. (block 2018). For example, the communicator 210 enables another route planner access to the emergency vehicle route 120 such as, for example, Google Maps™ and/or Waze™ GPS-based geographical navigation application to enable routes of vehicles that would otherwise travel on and/or otherwise traverse the emergency vehicle route 120 to be updated.

The program of FIG. 21 begins at block 2102 with the emergency vehicle route identifier 302 accessing one or more tasks to be performed by an unmanned aerial vehicle 102, 104, 106, 108 on or adjacent the emergency vehicle route 120 (block 2102). At block 2104, the traffic coordinator 128 performs the one or more tasks to coordinate traffic on or adjacent the emergency vehicle route (block 2104).

The program of FIG. 22 begins at block 2202 with the emergency vehicle route identifier 302 accessing one or more tasks to be performed by an unmanned aerial vehicle 102, 104, 106, 108 on or adjacent the emergency vehicle route 120 (block 2202). The traffic coordinator 128 performs one or more tasks to coordinate traffic on or adjacent the emergency vehicle route 120. In some examples, the tasks include coordinating traffic a threshold distance from the emergency vehicle 122. In some examples, performing the one or more tasks includes the vehicle identifier 306 identifying a vehicle on or adjacent the emergency vehicle route 120 (block 2204) and the direction of travel determiner 308 determining a direction of travel of the identified vehicle (block 2206).

The message selector 314 selects a message from a plurality of messages based on the one or more tasks assigned or a characteristic of the identified vehicle (block 2208). The traffic coordinator 128, the visual messenger controller 320 and/or the audio messenger controller 322 cause a message to be provided to the vehicle regarding the emergency vehicle 122 and/or to otherwise coordinate traffic (block 2210). The display controller 316 controls a direction that the visual message is provided to enable the vehicle or a passenger therein to receive the message (block 2212).

The vehicle responsiveness identifier 324 determines a responsiveness of the vehicle to the message (block 2214). At block 2116, the vehicle responsiveness identifier 324 determines whether the vehicle is responsive to the message (block 2116). If the identified vehicle is not responsive, the alerter 328 generates an alert accessible by the emergency vehicle 122 regarding the vehicle not being responsive (block 2118) and the traffic coordinator 128, the visual messenger controller 320 and/or the audio messenger controller 322 cause another message to be provided to the vehicle regarding the emergency vehicle 122 to traverse the emergency vehicle route 120 (block 2220).

Based on the vehicle being responsive to the message, the vehicle identifier 306 identifies a second vehicle on or adjacent the emergency vehicle route 120 (block 2222). The traffic coordinator 128, the visual messenger controller 320 and/or the audio messenger controller 322 cause a message to be provided to the second vehicle regarding the emergency vehicle 122 and/or to otherwise coordinate traffic (block 2224). The emergency route condition identifier 304 monitors the traffic on or adjacent the emergency vehicle route 120 (block 2226) and the vehicle saturation identifier 312 determines a saturation level based on the monitoring (block 2228).

The communicator 326 determines whether to coordinate traffic signals to reduce traffic on the emergency vehicle route 120 and/or to enable the emergency vehicle 120 to reach the destination 126 in a shorter time period (block 2230). In some examples, causing the traffic signals on the emergency vehicle route 120 to be coordinated is based on identifying one more characteristics of the traffic on or adjacent the emergency vehicle route 120. If the communicator 326 determines to coordinate the traffic signals, the communicator 326 causes the traffic signals to be coordinated (block 2232). In some examples, coordinating traffic includes enabling the emergency vehicle 122 to receive a right of way to pass through an intersection on the emergency vehicle route 120 and to encourage traffic to exit and/or not to enter the emergency vehicle route 120. In some examples, the traffic signals are carried by unmanned aerial vehicles.

Figure 23:
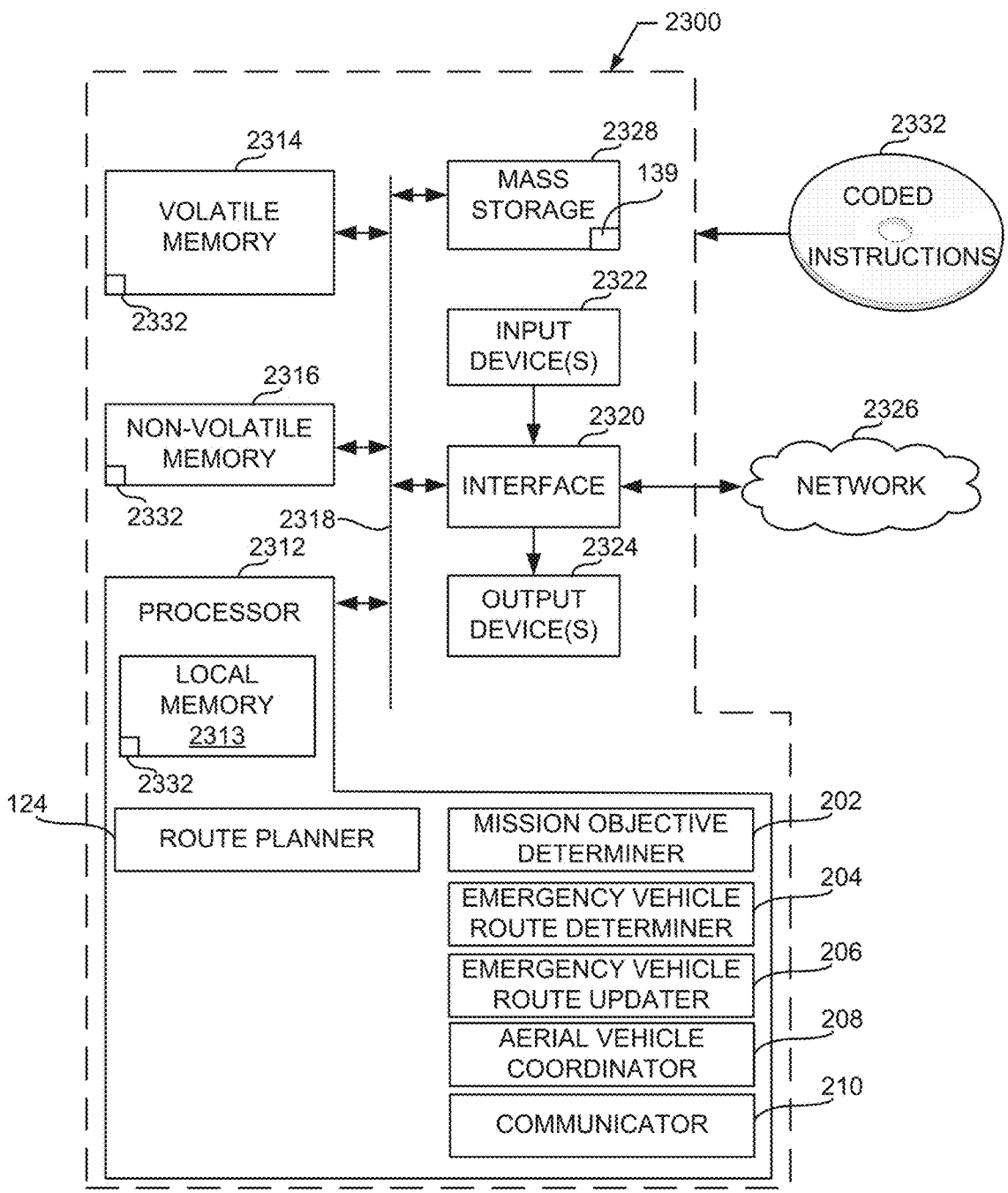
FIG. 23 is a processor platform to execute the instructions of FIGS. 19 and 20 to implement the route planner of FIG. 2.

FIG. 23 is a block diagram of an example processor platform 2300 capable of executing the instructions of FIGS.

19 and 20 to implement the route planner 124 of FIG. 2. The processor platform 2300 can be, for example, a server, a personal computer, a mobile device (e.g., a cell phone, a smart phone, a tablet such as an iPad™), a personal digital assistant (PDA), an Internet appliance, or any other type of computing device.

The processor platform 2300 of the illustrated example includes a processor 2312. The processor 2312 of the illustrated example is hardware. For example, the processor 2312 can be implemented by one or more integrated circuits, logic circuits, microprocessors or controllers from any desired family or manufacturer. The hardware processor may be a semiconductor based (e.g., silicon based) device. In this example, the processor implements example route planner 124, the example mission objective determiner 202, the example emergency vehicle route determiner 204, the example emergency vehicle updater 206, the example aerial vehicle coordinator and the example communicator 210.

The processor 2312 of the illustrated example includes a local memory 2313 (e.g., a cache). The processor 2312 of the illustrated example is in communication with a main memory including a volatile memory 2314 and a non-volatile memory 2316 via a bus 2318. The volatile memory 2314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2316 may be implemented by flash memory and/or any other desired type of memory device. Access to the main memory 2314, 2316 is controlled by a memory controller.

The processor platform 2300 of the illustrated example also includes an interface circuit 2320. The interface circuit 2320 may be implemented by any type of interface standard, such as an Ethernet interface, a universal serial bus (USB), and/or a PCI express interface.

In the illustrated example, one or more input devices 2322 are connected to the interface circuit 2320. The input device(s) 2322 permit(s) a user to enter data and/or commands into the processor 2312. The input device(s) can be implemented by, for example, an audio sensor, a microphone, a camera (still or video), a keyboard, a button, a mouse, a touchscreen, and/or a voice recognition system.

One or more output devices 2324 are also connected to the interface circuit 2320 of the illustrated example. The output devices 2324 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 2320 of the illustrated example, thus, typically includes a graphics driver card, a graphics driver chip and/or a graphics driver processor.

The interface circuit 2320 of the illustrated example also includes a communication device such as a transmitter, a receiver, a transceiver, a modem and/or network interface card to facilitate exchange of data with external machines (e.g., computing devices of any kind) via a network 2326 (e.g., an Ethernet connection, a digital subscriber line (DSL), a telephone line, coaxial cable, a cellular telephone system, etc.).

The processor platform 2300 of the illustrated example also includes one or more mass storage devices 2328 for storing software and/or data. Examples of such mass storage devices 2328 include floppy disk drives, hard drive disks, compact disk drives, Blu-ray disk drives, RAID systems, and digital versatile disk (DVD) drives.

The coded instructions 2332 of FIGS. 19 and 20 may be stored in the mass storage device 2328, in the volatile memory 2314, in the non-volatile memory 2316, and/or on a removable tangible computer readable storage medium such as a CD or DVD.

Figure 24:
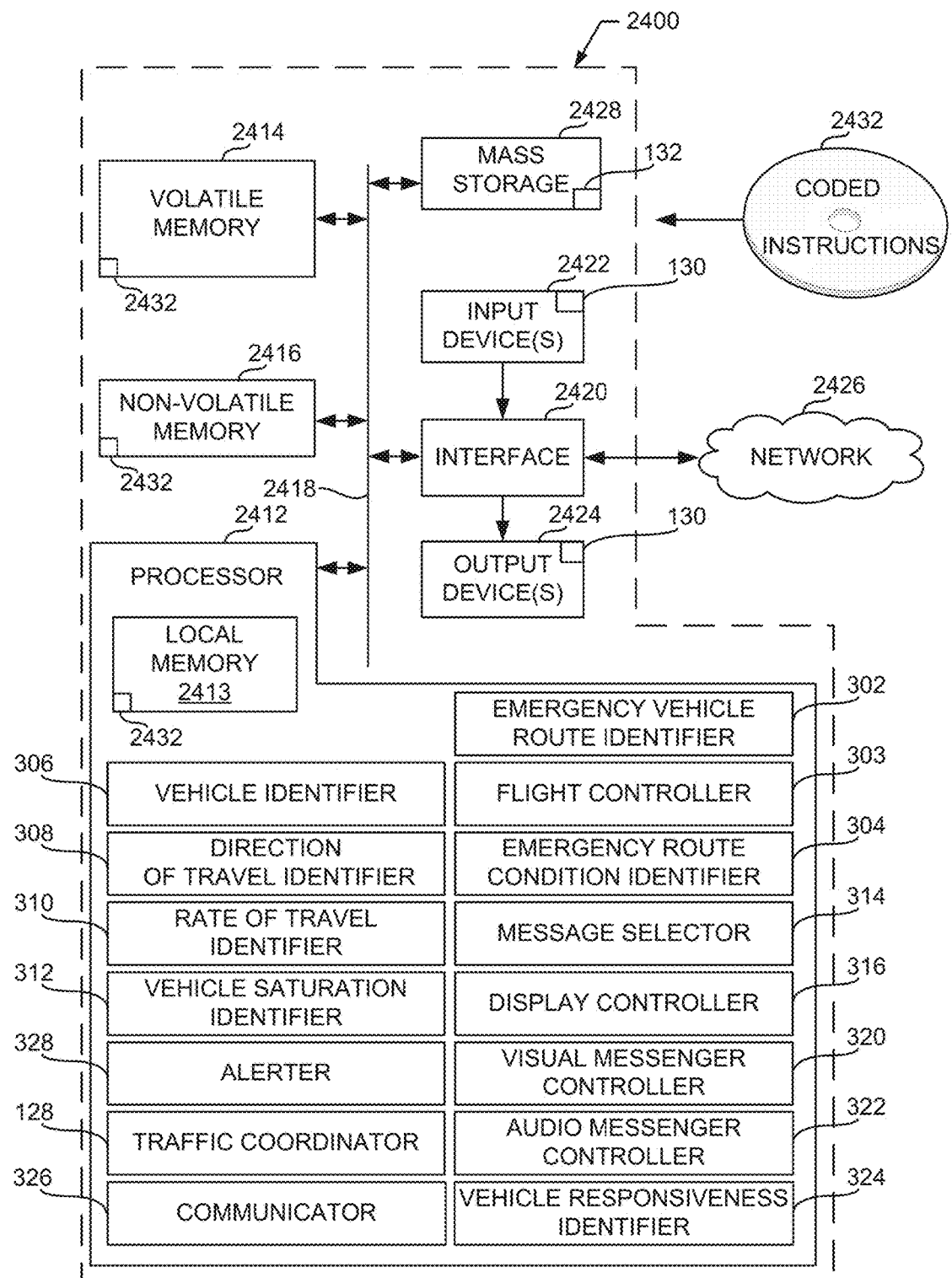
FIG. 24 is a processor platform to execute the instructions of FIGS. 21 and 22 to implement the route planner of FIG. 3.

FIG. 24 is a block diagram of an example processor platform 2400 capable of executing the instructions of FIGS. 21 and 22 to implement the traffic coordinator 128 of FIG. 3. The processor platform 2400 can be, for example, a server, a personal computer, a mobile device (e.g., a cell phone, a smart phone, a tablet such as an iPad™), a personal digital assistant (PDA), an Internet appliance, or any other type of computing device.

The processor platform 2400 of the illustrated example includes a processor 2412. The processor 2412 of the illustrated example is hardware. For example, the processor 2412 can be implemented by one or more integrated circuits, logic circuits, microprocessors or controllers from any desired family or manufacturer. The hardware processor may be a semiconductor based (e.g., silicon based) device. In this example, the processor implements the example emergency vehicle route identifier 302, the example flight controller 303, the example emergency route condition identifier 304, the example vehicle identifier 306, the example direction of travel identifier 308, the example rate of travel identifier 310, the example vehicle saturation identifier 312, the example message selector 314, the example display controller 316, the example visual messenger 320, the example audio messenger controller 322, the example vehicle responsiveness identifier 324, the example communicator 326, the example alerter 328, the example traffic coordinator 128.

The processor 2412 of the illustrated example includes a local memory 2413 (e.g., a cache). The processor 2412 of the illustrated example is in communication with a main memory including a volatile memory 2414 and a non-volatile memory 2416 via a bus 2418. The volatile memory 2414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2416 may be implemented by flash memory and/or any other desired type of memory device. Access to the main memory 2414, 2416 is controlled by a memory controller.

The processor platform 2400 of the illustrated example also includes an interface circuit 2420. The interface circuit 2420 may be implemented by any type of interface standard, such as an Ethernet interface, a universal serial bus (USB), and/or a PCI express interface.

In the illustrated example, one or more input devices 1022 are connected to the interface circuit 2420. The input device(s) 2422 permit(s) a user to enter data and/or commands into the processor 2412. The input device(s) can be implemented by, for example, an audio sensor, a microphone, a camera (still or video), a keyboard, a button, a mouse, a touchscreen, and/or a voice recognition system.

One or more output devices 2424 are also connected to the interface circuit 2420 of the illustrated example. The output devices 2424 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 2420 of the illustrated example, thus, typically includes a graphics driver card, a graphics driver chip and/or a graphics driver processor.

The interface circuit 2420 of the illustrated example also includes a communication device such as a transmitter, a receiver, a transceiver, a modem and/or network interface card to facilitate exchange of data with external machines (e.g., computing devices of any kind) via a network 2426 (e.g., an Ethernet connection, a digital subscriber line (DSL), a telephone line, coaxial cable, a cellular telephone system, etc.).

The processor platform 2400 of the illustrated example also includes one or more mass storage devices 2428 for storing software and/or data. Examples of such mass storage devices 2428 include floppy disk drives, hard drive disks, compact disk drives, Blu-ray disk drives, RAID systems, and digital versatile disk (DVD) drives.

The coded instructions 2432 of FIGS. 21 and 22 may be stored in the mass storage device 2428, in the volatile memory 2414, in the non-volatile memory 2416, and/or on a removable tangible computer readable storage medium such as a CD or DVD.

From the foregoing, it will be appreciated that example methods, apparatus and articles of manufacture have been disclosed that relate to developing and implementing a coordinated traffic solution to enable an emergency vehicle to reach its destination in less time by causing UAVs implemented with the teachings of this disclosure to provide advanced notice of the approaching emergency vehicle. Thus, the examples disclosed herein enable vehicles, individuals, etc. to react prior to when they would otherwise (e.g., when the siren of the ambulance is close enough to be heard). In other words, the examples disclosed herein provide notice of the approaching emergency vehicles and/or of the emergency vehicle route to enable the right of way to be provided to emergency vehicles.

EXAMPLE 1

An example apparatus includes an unmanned aerial vehicle including a body and a propulsion source to propel the unmanned aerial vehicle during flight; and a display carried by the unmanned aerial vehicle to display a message to coordinate traffic, the display actuatable between a deployed position to enable the message to be conveyed and a stowed position in which aerodynamics of the unmanned aerial vehicle are enhanced.

EXAMPLE 2

In Example 1 or other examples, further including a support arm extending from the body, the display coupled to the support arm.

EXAMPLE 3

In Example 2 or other examples, the support arm includes devises in which an elongated member of the display is received to rotatably couple the display to the support arm.

EXAMPLE 4

In Example 3 or other examples, further including a motor, wherein the support arm carries a first gear and the elongated member carries a second gear that interfaces with the first gear, wherein the motor is to drive the first gear and the first gear is to rotate the second gear to move the display.

EXAMPLE 5

In Examples 1, 2 or other examples, further including a display assembly coupled to the body, the display assembly including the display.

EXAMPLE 6

In Example 5 or other examples, the display is a first display, wherein the display assembly includes a second display.

EXAMPLE 7

In Example 5 or other examples, the display assembly enables the display to be rotatable relative to a center axis of the body.

EXAMPLE 8

In Example 7 or other examples, further including a motor to rotate the display relative to the center axis.

EXAMPLE 9

In Examples 1, 2 or other examples, the display includes display segments that are coupled to enable the display to be foldable onto itself in the stowed position.

EXAMPLE 10

In Examples 1, 2 or other examples, the display includes a fabric material to enable the display to be foldable onto itself in the stowed position.

EXAMPLE 11

In Example 1 or other examples, the display is foldable onto itself in the stowed position, further including a pulley carried by a support arm that receives a cable, the cable to be received through apertures included on sides of the display to enable the display to be moved toward the stowed position when the cable moves in a first direction and for the display to be moved toward the deployed position when the cable moves in a second direction.

EXAMPLE 12

In Example 11 or other examples, further including a spindle and a motor, the motor to drive the spindle to wind or unwind the cable about the spindle to move the display.

EXAMPLE 13

An example apparatus, includes a display assembly to be coupled to an unmanned aerial vehicle body, the display assembly including a display to display a message to coordinate traffic, the display actuatable between a deployed position to enable the message to be conveyed and a stowed position in which aerodynamics of the unmanned aerial vehicle to which the display assembly is to be coupled are enhanced.

EXAMPLE 14

In Example 13 or other examples, the display assembly includes a base and a support arm extending from the base, the display coupled to the support arm.

EXAMPLE 15

In Example 14 or other examples, the base includes slots to receive fasteners to enable the display assembly to be coupled to the unmanned aerial vehicle.

EXAMPLE 16

In Example 14 or other examples, the support arm includes devises in which an elongated member of the display is received to rotatable couple the display to the support arm.

EXAMPLE 17

In Example 16 or other examples, further including a motor, wherein the support arm carries a first gear and the elongated member carries a second gear that interfaces with the first gear, wherein the motor is to drive the first gear and the first gear is to rotate the second gear to move the display.

EXAMPLE 18

In Example 14 or other examples, the display is foldable onto itself in the stowed position, further including a pulley carried by the support arm that receives a cable, the cable to be received through apertures included on sides of the display to enable the display to be moved toward the stowed position when the cable moves in a first direction and for the display to be moved toward the deployed position when the cable moves in a second direction.

EXAMPLE 19

In Example 18 or other examples, further including a spindle and a motor, the motor to drive the spindle to wind or unwind the cable about the spindle to move the display.

EXAMPLE 20

In Example 14 or other examples, the support arm is rotatable relative to the base.

EXAMPLE 21

In Examples 13 or 14, the display includes display segments that are coupled to enable the display to be foldable onto itself in the stowed position.

EXAMPLE 22

In Examples 13 or 14, the display includes a fabric material to enable the display to be foldable onto itself in the stowed position.

EXAMPLE 23

An example method, includes: determining, by executing an instruction with at least one processor, an emergency vehicle route for an emergency vehicle to traverse; based on the emergency vehicle route, assigning, by executing an instruction with the at least one processor, one or more tasks for one or more unmanned aerial vehicles to execute to coordinate traffic on or adjacent the emergency vehicle route; and communicating, by executing an instruction with the at least one processor, the one or more tasks to the one or more unmanned aerial vehicles.

EXAMPLE 24

In Example 23 or other examples, the emergency vehicle route is a first emergency vehicle route, further including accessing feedback from the one or more unmanned aerial vehicles and updating the first emergency vehicle route to a second emergency vehicle route based on the feedback.

EXAMPLE 25

In Example 24 or other examples, the feedback includes data regarding traffic on or adjacent the emergency vehicle route.

EXAMPLE 26

In Example 24 or other examples, based on the second emergency vehicle route, assigning one or more second tasks for the one or more unmanned aerial vehicles to execute to coordinate traffic on or adjacent the second emergency vehicle route; and communicating the one or more second tasks with the one or more unmanned aerial vehicles.

EXAMPLE 27

In Example 24 or other examples, updating the first emergency vehicle route to the second emergency vehicle route is based on a travel time to a destination of the emergency vehicle being less by the emergency vehicle taking the second emergency vehicle than by the emergency vehicle taking the first emergency vehicle route.

EXAMPLE 28

An example tangible computer-readable medium comprising instructions that, when executed, cause a processor to, at least: determine an emergency vehicle route for an emergency vehicle to traverse; based on the emergency vehicle route, assign one or more tasks for one or more unmanned aerial vehicles to execute to coordinate traffic on or adjacent the emergency vehicle route; and communicate the one or more tasks with the one or more unmanned aerial vehicles.

EXAMPLE 29

In Example 28 or other examples, the emergency vehicle route is a first emergency vehicle route, wherein the instructions, when executed, further cause the processor to access feedback from the one or more unmanned aerial vehicles and update the first emergency vehicle route to a second emergency vehicle route.

EXAMPLE 30

In Example 30 or other examples, the feedback includes data regarding traffic on or adjacent the emergency vehicle route.

EXAMPLE 31

In Example 29 or other examples, the instructions, when executed, further cause the processor to assign one or more second tasks for the one or more unmanned aerial vehicles to execute to coordinate traffic on or adjacent the second emergency vehicle route; and communicate the one or more second tasks with the one or more unmanned aerial vehicles.

EXAMPLE 32

In Example 31 or other examples, updating the first emergency vehicle route to the second emergency vehicle route is based on a travel time to a destination of the emergency vehicle being less by the emergency vehicle taking the second emergency vehicle than by the emergency vehicle taking the first emergency vehicle route.

EXAMPLE 33

An example apparatus includes an emergency vehicle route determiner to determine an emergency vehicle route for an emergency vehicle to traverse; an aerial vehicle coordinator to assign one or more tasks for one or more unmanned aerial vehicles to execute to coordinate traffic on or adjacent the emergency vehicle route; and a communicator to communicate the one or more tasks with the one or more unmanned aerial vehicles.

EXAMPLE 34

In Example 33 or other examples, the emergency vehicle route is a first emergency vehicle route, further including an emergency vehicle route updater to access feedback from the one or more unmanned aerial vehicles and to update the first emergency vehicle route to a second emergency vehicle route based on the feedback.

EXAMPLE 35

In Example 34 or other examples, the feedback includes data regarding traffic on or adjacent the emergency vehicle route.

EXAMPLE 36

In Example 34 or other examples, based on the second emergency vehicle route, the aerial vehicle coordinator to assign one or more second tasks for the one or more unmanned aerial vehicles to execute to coordinate traffic on or adjacent the second emergency vehicle route; and the communicator is to communicate the one or more second tasks with the one or more unmanned aerial vehicles.

EXAMPLE 37

In Example 36 or other examples, the emergency vehicle route updater is to update the first emergency vehicle route to the second emergency vehicle route based on a travel time to a destination of the emergency vehicle being less by the emergency vehicle taking the second emergency route than by the emergency vehicle taking the first emergency vehicle route.

EXAMPLE 38

An example apparatus includes means for determining an emergency vehicle route for an emergency vehicle to traverse; means for assigning one or more tasks for one or more unmanned aerial vehicles to execute to coordinate traffic on or adjacent the emergency vehicle route; and means for communicating the one or more tasks with the one or more unmanned aerial vehicles.

EXAMPLE 39

In Example 38 or other examples, the emergency vehicle route is a first emergency vehicle route, further including means for accessing feedback from the one or more unmanned aerial vehicles and means for updating the first emergency vehicle route to a second emergency vehicle route.

EXAMPLE 40

In Example 39 or other examples, the feedback includes data regarding traffic on or adjacent the emergency vehicle route.

EXAMPLE 41

In Example 39 or other examples, further including means for assigning one or more second tasks for the one or more unmanned aerial vehicles to execute to coordinate traffic on or adjacent the second emergency vehicle route; and means for communicating the one or more second tasks with the one or more unmanned aerial vehicles.

EXAMPLE 42

An example method, includes accessing, by executing an instruction with at least one processor, one or more tasks to be performed by an unmanned aerial vehicle on or adjacent an emergency vehicle route; and performing, by executing an instruction with the at least one processor, the one or more tasks to coordinate traffic on or adjacent the emergency vehicle route.

EXAMPLE 43

In Example 42 or other examples, the tasks include coordinating traffic a threshold distance from an emergency vehicle.

EXAMPLE 44

In Examples 42 or 43, the performing of the one or more tasks includes identifying a vehicle on or adjacent the emergency vehicle route and providing a message to the vehicle associated with an emergency vehicle to traverse the emergency vehicle route.

EXAMPLE 45

In Example 44 or other examples, the performing of the one or more tasks includes determining a direction of travel of the vehicle, wherein the providing of the message to the vehicle is based on the vehicle traveling toward or on the emergency vehicle route.

EXAMPLE 46

In Example 44 or other examples, the performing of the one or more tasks including determining a responsiveness of the vehicle to the message, wherein, based on the vehicle not being responsive to the message, generating an alert accessible by the emergency vehicle regarding the vehicle not being responsive and, based on the vehicle being responsive to the message, identifying a second vehicle on or adjacent the emergency vehicle route and providing a second message to the second vehicle regarding the emergency vehicle.

EXAMPLE 47

In Example 44 or other examples, further including selecting the message from a plurality of messages based on the one or more tasks assigned or a characteristic of the vehicle.

EXAMPLE 48

In Example 47 or other examples, the characteristic includes a direction that the vehicle is traveling on the emergency vehicle route.

EXAMPLE 49

In Example 44 or other examples, the message is a visual message or an audio message.

EXAMPLE 50

In Example 49 or other examples, further including controlling a direction that the visual message is provided to enable the vehicle or a passenger therein to receive the message.

EXAMPLE 51

In Examples 42 or 43, further including causing traffic signals on the emergency vehicle route to be coordinated to reduce traffic on the emergency vehicle route or to enable the emergency vehicle to reach a destination in a shorter time period.

EXAMPLE 52

In Example 51 or other examples, causing the traffic signals on the emergency vehicle route to be coordinated is based on identifying one more characteristics of the traffic on or adjacent the emergency vehicle route.

EXAMPLE 53

In Example 52 or other examples, coordinating traffic includes enabling the emergency vehicle to receive a right of way to pass through an intersection on the emergency vehicle route and to encourage traffic to exit and not to enter the emergency vehicle route.

EXAMPLE 54

In Example 51 or other examples, the traffic signals are carried by unmanned aerial vehicles.

EXAMPLE 55

In Examples 42 or 43, the performing of the one or more tasks to coordinate traffic on or adjacent the emergency vehicle route includes the unmanned aerial vehicle flying to a location on or adjacent the emergency vehicle route.

EXAMPLE 56

In Examples 42 or 43, the performing of the one or more tasks includes monitoring the traffic on or adjacent the emergency vehicle route and determining a saturation level based on the monitoring.

EXAMPLE 57

An example tangible computer-readable medium comprising instructions that, when executed, cause a processor to, at least: access one or more tasks to be performed by an unmanned aerial vehicle on or adjacent an emergency vehicle route; and perform the one or more tasks to coordinate traffic on or adjacent the emergency vehicle route.

EXAMPLE 58

In Example 57 or other examples, the tasks include coordinating traffic a threshold distance from an emergency vehicle.

EXAMPLE 59

In Example 57 or other examples, the instructions, when executed, further cause the processor to identify a vehicle on or adjacent the emergency vehicle route and provide a message to the vehicle associated with an emergency vehicle to traverse the emergency vehicle route.

EXAMPLE 60

In Example 59 or other examples, the instructions, when executed, further cause the processor to provide the message to the vehicle based on the vehicle traveling toward or on the emergency vehicle route.

EXAMPLE 61

In Example 59 or other examples, the instructions, when executed, further cause the processor to determine a responsiveness of the vehicle to the message, wherein the instructions, when executed, further cause the processor to generate an alert accessible by the emergency vehicle based on the vehicle not being responsive to the message.

EXAMPLE 62

In Example 61 or other examples, the instructions, when executed, further cause the processor to, based on the vehicle being responsive to the message, identify a second vehicle on or adjacent the emergency vehicle route and provide a second message to the second vehicle associated with the emergency vehicle.

EXAMPLE 63

In Example 59 or other examples, the instructions, when executed, further cause the processor to select the message from a plurality of messages based on the one or more tasks assigned or a characteristic of the vehicle.

EXAMPLE 64

In Example 63 or other examples, the characteristic includes a direction that the vehicle is traveling on the emergency vehicle route.

EXAMPLE 65

In Example 59 or other examples, the message is a visual message or an audio message.

EXAMPLE 66

In Example 65 or other examples, the instructions, when executed, further cause the processor to control a direction that the visual message is provided to enable the vehicle or a passenger therein to receive the message.

EXAMPLE 67

In Example 57 or other examples, the instructions, when executed, further cause the processor to cause traffic signals on the emergency vehicle route to be coordinated to reduce traffic on the emergency vehicle route or to enable an emergency vehicle to traverse the emergency vehicle route to reach a destination in a shorter time period.

EXAMPLE 68

In Example 67 or other examples, the processor is to cause the traffic signals on the emergency vehicle route to be coordinated based on one more characteristics of the traffic on or adjacent the emergency vehicle route.

EXAMPLE 69

In Example 67 or other examples, the processor is to coordinate the traffic by enabling the emergency vehicle to receive a right of way to pass through an intersection on the emergency vehicle route and to encourage traffic to exit and not to enter the emergency vehicle route.

EXAMPLE 70

An example apparatus, includes an emergency vehicle route identifier to access one or more tasks to be performed by an unmanned aerial vehicle on or adjacent an emergency vehicle route; and a traffic coordinator to perform the one or more tasks to coordinate traffic on or adjacent the emergency vehicle route.

EXAMPLE 71

In Example 70 or other examples, the tasks include coordinating traffic a threshold distance from an emergency vehicle.

EXAMPLE 72

In Examples 70, 71 or other examples, the traffic coordinator includes the emergency vehicle route identifier.

EXAMPLE 73

In Example 70, 71 or other examples, further including a vehicle identifier to identify a vehicle on or adjacent the emergency vehicle route, the traffic coordinator to cause a message to be provided the vehicle associated with the emergency vehicle.

EXAMPLE 74

In Example 73 or other examples, further including a direction of travel identifier to determine a direction of travel of the vehicle, wherein the traffic coordinator is to provide the message to the vehicle based on the vehicle traveling toward or on the emergency vehicle route.

EXAMPLE 75

In Example 73 or other examples, further including a vehicle responsiveness identifier to determine a responsiveness of the vehicle to the message, further including an alerter to generate an alert accessible by the emergency vehicle based on the vehicle not being responsive to the message.

EXAMPLE 76

In Example 75 or other examples, the vehicle identifier is to identify a second vehicle on or adjacent the emergency vehicle route, the traffic coordinator to cause a second message to be provided to the second vehicle associated with the emergency vehicle.

EXAMPLE 77

In Example 73 or other examples, further including a message selector to select the message from a plurality of messages based on the one or more tasks assigned or a characteristic of the vehicle.

EXAMPLE 78

In Example 77 or other examples, the characteristic includes a direction that the vehicle is traveling on the emergency vehicle route.

EXAMPLE 79

In Example 73 or other examples, the message is a visual message or an audio message.

EXAMPLE 80

In Example 79 or other examples, further including a visual message controller to control the visual message provided to the vehicle.

EXAMPLE 81

In Example 79 or other examples, further including an audio message controller to control the audio message provided to the vehicle.

EXAMPLE 82

In Example 79 or other examples, further including a display controller to control a direction that the visual message is positioned to enable the vehicle or a passenger therein to receive the message.

EXAMPLE 83

In Examples 70, 71 or other examples, further including a communicator to cause traffic signals on the emergency vehicle route to be coordinated to reduce traffic on the emergency vehicle route or to enable the emergency vehicle to reach a destination in a shorter time period.

EXAMPLE 84

In Example 83 or other examples, the communicator is to cause the traffic signals on the emergency vehicle route to be coordinated based on identifying one more characteristics of the traffic on or adjacent the emergency vehicle route.

EXAMPLE 85

In Example 83 or other examples, the communicator is to coordinate traffic by enabling the emergency vehicle to receive a right of way to pass through an intersection on the emergency vehicle route and to encourage traffic to exit and not to enter the emergency vehicle route.

EXAMPLE 86

In Examples 70, 71 or other examples, a flight controller of the traffic coordinator is to perform the one or more tasks to coordinate traffic on or adjacent the emergency vehicle route.

EXAMPLE 87

In Example 86 or other examples, the flight controller is to cause the unmanned aerial vehicle to fly to a location on or adjacent the emergency vehicle route.

EXAMPLE 88

An example apparatus, includes means for accessing tasks to be performed by an unmanned aerial vehicle on or adjacent an emergency vehicle route; and means for performing the one or more tasks to coordinate traffic on or adjacent the emergency vehicle route.

EXAMPLE 89

In Example 88 or other examples, the tasks include coordinating traffic a threshold distance from an emergency vehicle.

EXAMPLE 90

In Example 88 or other examples, further including means for identifying a vehicle on or adjacent the emergency vehicle route and means for providing a message to the vehicle associated with an emergency vehicle to traverse the emergency vehicle route.

EXAMPLE 91

In Example 90 or other examples, further including means for determining a direction of travel of the vehicle, wherein the means for providing of the message to the vehicle is based on the vehicle traveling toward or on the emergency vehicle route.

EXAMPLE 92

In Example 90 or other examples, further including means determining a responsiveness of the vehicle to the message, further including means for generating an alert accessible by the emergency vehicle based on the vehicle not being responsive to the message,

EXAMPLE 93

In Example 92 or other examples, further including means for identifying a second vehicle on or adjacent the emergency vehicle route based on the vehicle being responsive to the message, further including providing a second message to the second vehicle associated with the emergency vehicle.

EXAMPLE 94

In Example 90 or other examples, further including means for selecting the message from a plurality of messages based on the one or more tasks assigned or a characteristic of the vehicle.

EXAMPLE 95

In Example 94 or other examples, the characteristic includes a direction that the vehicle is traveling on the emergency vehicle route.

EXAMPLE 96

In Example 90 or other examples, the message is a visual message or an audio message.

EXAMPLE 97

In Example 96 or other examples, further including means for controlling a direction that the visual message is provided to enable the vehicle or a passenger therein to receive the message.

EXAMPLE 98

In Examples 88, 89 or other examples, further including means for causing traffic signals on the emergency vehicle route to be coordinated to reduce traffic on the emergency vehicle route or to enable the emergency vehicle to reach a destination in a shorter time period.

EXAMPLE 99

In Example 98 or other examples, causing traffic signals on the emergency vehicle route to be coordinated is based on identifying one more characteristics of the traffic on or adjacent the emergency vehicle route.

EXAMPLE 100

In Example 99 or other examples, coordinating traffic includes enabling the emergency vehicle to receive a right of way to pass through an intersection on the emergency vehicle route and to encourage traffic to exit and not to enter the emergency vehicle route.

EXAMPLE 101

In Examples 88 or 89, further including means for monitoring the traffic on or adjacent the emergency vehicle route and determining a saturation level based on the monitoring.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. An unmanned aerial vehicle comprising:
a body and a propulsion source to propel the unmanned aerial vehicle during flight;

a display carried by the unmanned aerial vehicle to display a message to coordinate traffic, the display actuatable between a deployed position to enable the message to be conveyed and a stowed position in which aerodynamics of the unmanned aerial vehicle are enhanced, the display foldable onto itself in the stowed position; and a pulley carried by a support arm that receives a cable, the cable to be received through apertures included on sides of the display to enable the display to be moved toward the stowed position when the cable moves in a first direction and for the display to be moved toward the deployed position when the cable moves in a second direction.

2. The unmanned aerial vehicle of claim 1, further including a spindle and a motor, the motor to drive the spindle to wind or unwind the cable about the spindle to move the display.

3. A non-transitory computer-readable medium comprising instructions that, when executed, cause a processor of an unmanned aerial vehicle on or adjacent an emergency vehicle route to, at least:

identify a first vehicle on or adjacent the emergency vehicle route;

provide a first message to instruct the first vehicle to move relative to the emergency vehicle route;

generate an alert in response to the first vehicle not obeying the instructions of the first message, the alert accessible by an emergency vehicle traversing the emergency vehicle route; and after the first vehicle obeys the instructions of the first message:

identify a second vehicle on or adjacent the emergency vehicle route; and provide a second message to the second vehicle.

4. The non-transitory computer-readable medium as defined in claim 3, wherein the instructions cause the processor to coordinate traffic a threshold distance from the emergency vehicle.

5. The non-transitory computer-readable medium as defined in claim 3, wherein the instructions, when executed, further cause the processor to provide the first message to the first vehicle on a display oriented at the first vehicle.

6. The non-transitory computer-readable medium as defined in claim 3, wherein the instructions, when executed, further cause the processor to select the first message from a plurality of messages based on at least one of one or more tasks assigned to the first vehicle or a characteristic of the first vehicle, the characteristic includes a direction that the first vehicle is traveling on the emergency vehicle route.

7. The non-transitory computer-readable medium as defined in claim 3, wherein the first message is at least one of a visual message or an audio message.

8. The non-transitory computer-readable medium as defined in claim 7, wherein the instructions, when executed, further cause the processor to control a direction of a display of the unmanned aerial vehicle to present the visual message in a direction to enable the first vehicle or a passenger therein to receive the first message.

9. The non-transitory computer-readable medium as defined in claim 3, wherein the instructions, when executed, further cause the processor to cause traffic signals on the emergency vehicle route to be coordinated to reduce traffic on the emergency vehicle route or to enable the emergency vehicle to traverse the emergency vehicle route to reach a destination in a shorter time period.

10. The non-transitory computer-readable medium as defined in claim 3, wherein the processor is to coordinate traffic by enabling the emergency vehicle to receive a right of way to pass through an intersection on the emergency vehicle route and to at least one of encourage traffic to exit or not to enter the emergency vehicle route.

11. An apparatus, comprising:

an emergency vehicle route identifier to access one or more tasks to be performed by an unmanned aerial vehicle on or adjacent an emergency vehicle route;

a vehicle identifier to identify a first vehicle on or adjacent the emergency vehicle route;

a visual messenger controller to provide a first message to instruct the first vehicle to move relative to the emergency vehicle route;

a vehicle responsiveness identifier to identify a second vehicle on or adjacent the emergency vehicle route after the first vehicle obeys the instructions of the first message, the visual messenger controller to provide a second message to the second vehicle after the first vehicle obeys the instructions of the first message; and an alerter to generate an alert in response to the first vehicle not obeying the instructions of the first message, the alert accessible by an emergency vehicle traversing the emergency vehicle route.

12. A method, comprising:

accessing, by executing an instruction with at least one processor, one or more tasks to be performed by an unmanned aerial vehicle on or adjacent an emergency vehicle route;

identifying a first vehicle on or adjacent the emergency vehicle route;

providing a first message to instruct the first vehicle to move relative to the emergency vehicle route;

generating an alert in response to the first vehicle not obeying the instructions of the first message, the alert accessible by an emergency vehicle traversing the emergency vehicle route; and after the first vehicle obeys the instructions of the first message:

identifying a second vehicle on or adjacent the emergency vehicle route; and providing a second message to the second vehicle.

13. An unmanned aerial vehicle, comprising:

means for accessing an emergency vehicle route, the accessing means to access one or more tasks to be performed by an unmanned aerial vehicle on or adjacent the emergency vehicle route;

means for identifying a vehicle, the identifying means to identify a first vehicle on or adjacent the emergency vehicle route;

means for providing a visual message, the providing means to provide a first message to instruct the first vehicle to move relative to the emergency vehicle route;

means for determining vehicle responsiveness, the determining means to identify a second vehicle on or adjacent the emergency vehicle route after the first vehicle obeys the instructions of the first message, the providing means to provide a second message to the second vehicle after the first vehicle obeys the instructions of the first message; and means for generating alerts, the generating means to generate an alert in response to the first vehicle not obeying the instructions of the first message, the alert accessible by an emergency vehicle traversing the emergency vehicle route.

14. The unmanned aerial vehicle of claim 13, wherein the unmanned aerial vehicle is to coordinate traffic a threshold distance from the emergency vehicle.

15. The unmanned aerial vehicle of claim 13, wherein the providing means is to provide the first message to a display oriented at the first vehicle.

16. The unmanned aerial vehicle of claim 13, further including a means for selecting a message, the selection means to select the first message from a plurality of messages based on at least one of one or more tasks assigned to the first vehicle or a characteristic of the first vehicle, the characteristic includes a direction that the first vehicle is traveling on the emergency vehicle route.

17. The unmanned aerial vehicle of claim 13, wherein the first message is at least one of a visual message or an audio message.

18. The unmanned aerial vehicle of claim 17, further including a means for controlling a display, the controlling means to control a direction of the display of the unmanned aerial vehicle to present the visual message in a direction to enable the first vehicle or a passenger therein to receive the first message.

19. The unmanned aerial vehicle of claim 13, further including a means for communicating, the communicating means to cause traffic signals on the emergency vehicle route to be coordinated to reduce traffic on the emergency vehicle route or to enable the emergency vehicle to traverse the emergency vehicle route to reach a destination in a shorter time period.

20. The unmanned aerial vehicle of claim 13, further including a means for communicating, wherein the communicating means is to coordinate traffic by enabling the emergency vehicle to receive a right of way to pass through an intersection on the emergency vehicle route and to at least one of encourage traffic to exit or not to enter the emergency vehicle route.

21. The apparatus of claim 11, wherein the apparatus is to coordinate traffic a threshold distance from the emergency vehicle.

22. The apparatus of claim 11, wherein the visual message controller is to provide the first message to a display oriented at the first vehicle.

* * * * *